(12) United States Patent
Gammerler

(10) Patent No.: US 8,356,967 B2
(45) Date of Patent: Jan. 22, 2013

(54) STACKER, STACKING SYSTEM OR ASSEMBLY AND METHOD FOR STACKING

(75) Inventor: Gunter Gammerler, Osprey, FL (US)

(73) Assignee: GammTech Corporation, Palmetto, FL (US)

( * ) Notice: Subject to any disclaimer, the term of this patent is extended or adjusted under 35 U.S.C. 154(b) by 396 days.

(21) Appl. No.: 12/723,893

(22) Filed: Mar. 15, 2010

(65) Prior Publication Data

US 2011/0224820 A1 Sep. 15, 2011

(51) Int. Cl.
*B65H 29/16* (2006.01)
*B65H 31/32* (2006.01)
*B65H 29/18* (2006.01)

(52) U.S. Cl. ............ 414/790.8; 414/924; 414/794.1; 414/794.2; 271/218

(58) Field of Classification Search ............ 108/53.1; 187/347, 361, 404; 198/419.3, 794; 254/89 H; 271/292; 414/331.01, 331.14, 331.16, 331.17, 414/331.18, 601, 602, 673, 719, 789.9, 790, 414/790.1, 790.4, 791.8, 792, 792.2, 792.3, 414/793.4, 793.8, 794.5, 794.6, 795.8, 796.7, 414/797.5, 798, 924; 52/118; 901/48; 91/167 R; 92/137, 51
See application file for complete search history.

(56) References Cited

U.S. PATENT DOCUMENTS

| | | | |
|---|---|---|---|
| 2,107,210 A * | 2/1938 | Palm | 414/137.2 |
| 2,819,661 A | 1/1958 | Howdle et al. | |
| 3,006,258 A | 10/1961 | Jochem | |
| 3,027,817 A | 4/1962 | Loeffler | |
| 3,498,600 A | 3/1970 | Spencer et al. | |
| 4,060,231 A | 11/1977 | Stobb et al. | |
| 4,136,864 A * | 1/1979 | Obenshain | 271/217 |
| 4,189,270 A | 2/1980 | Ehrlich | |
| 4,586,315 A | 5/1986 | Wolf | |
| 4,934,687 A | 6/1990 | Hayden et al. | |
| 5,328,323 A | 7/1994 | Molison | |
| 5,370,382 A | 12/1994 | Wetter | |
| 5,388,746 A | 2/1995 | Hatchell et al. | |
| 5,842,327 A | 12/1998 | Schwede | |
| 6,149,149 A | 11/2000 | Gammerler et al. | |

FOREIGN PATENT DOCUMENTS

| | | |
|---|---|---|
| DE | 1228275 B | 11/1966 |
| DE | 7236337 U | 4/1973 |
| DE | 2742983 A1 | 4/1978 |
| DE | 9317919 U1 | 4/1994 |
| DE | 19615009 A1 | 10/1997 |
| DE | 19733705 A1 | 2/1999 |
| DE | 19800162 A1 | 7/1999 |
| EP | 586802 A1 | 3/1994 |
| EP | 626330 A2 | 11/1994 |
| GB | 1162454 A | 8/1969 |
| GB | 1283729 A | 8/1972 |
| GB | 2143201 A | 2/1985 |
| JP | 57131663 A | 8/1982 |

* cited by examiner

*Primary Examiner* — Gregory Adams
(74) *Attorney, Agent, or Firm* — Jacox, Meckstroth & Jenkins

(57) ABSTRACT

A stacking system and method that utilizes a device control for precisely controlling the downward movement of at least one printed material support at a first speed, while substantially simultaneously permitting upward movement of the at least one support at a second speed which is greater than the first speed.

50 Claims, 13 Drawing Sheets

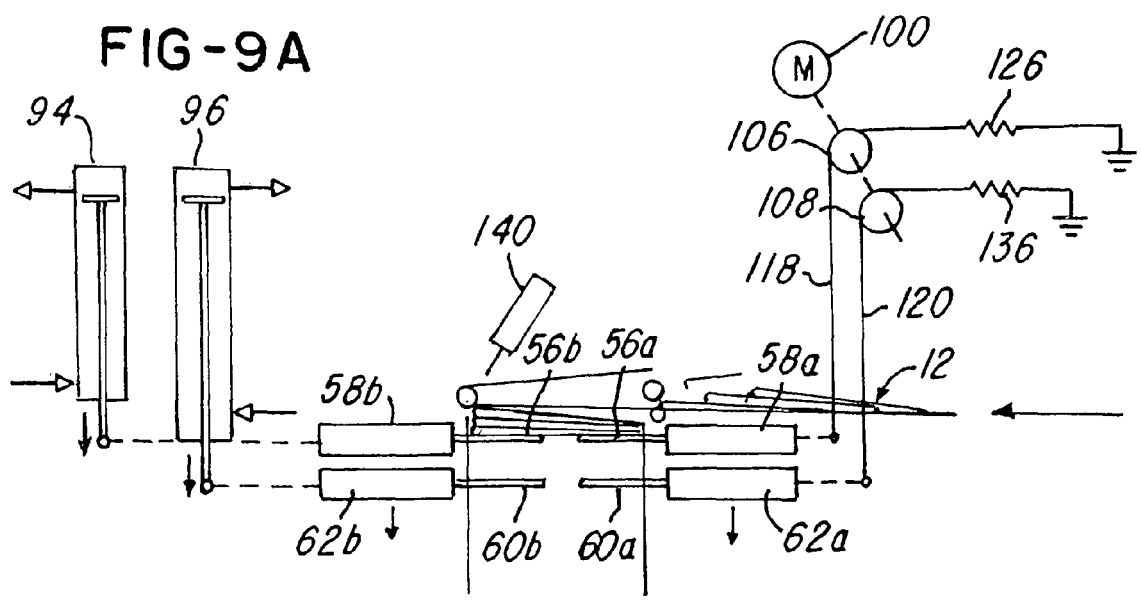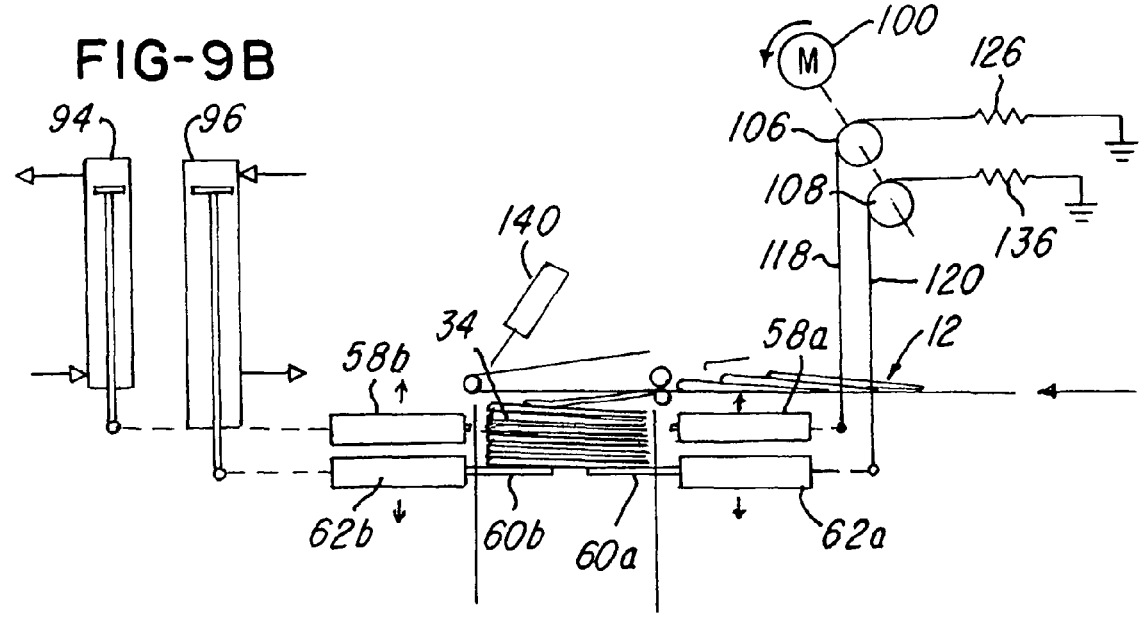

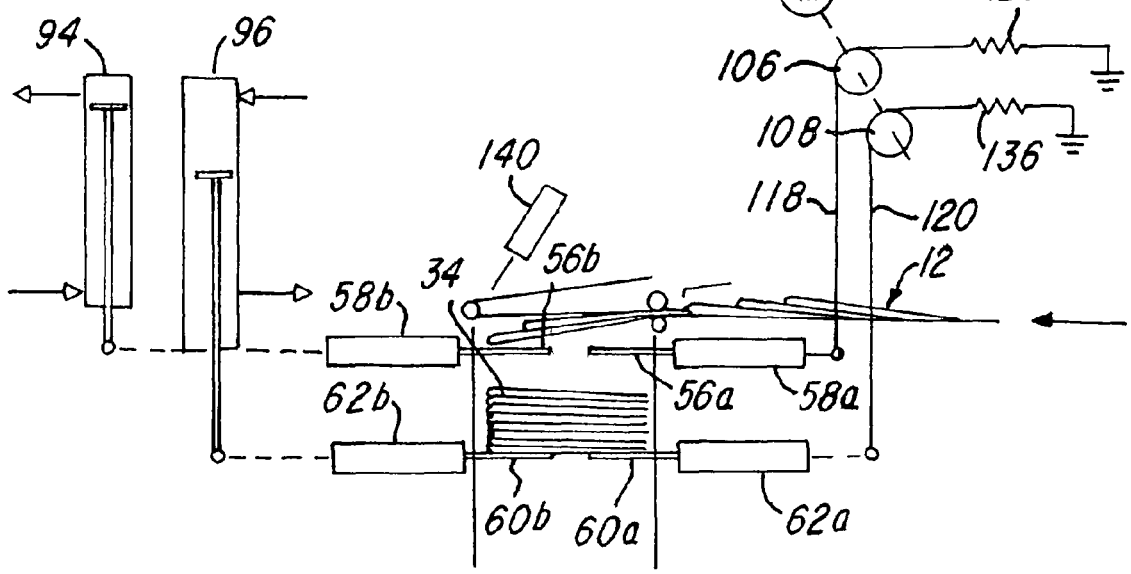
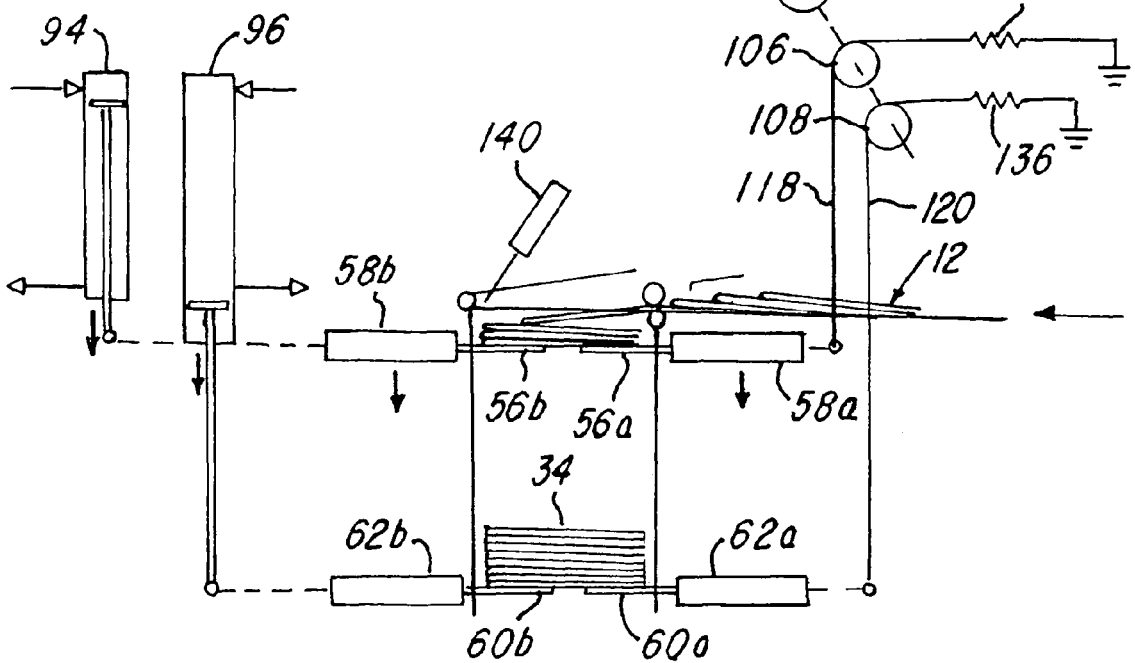

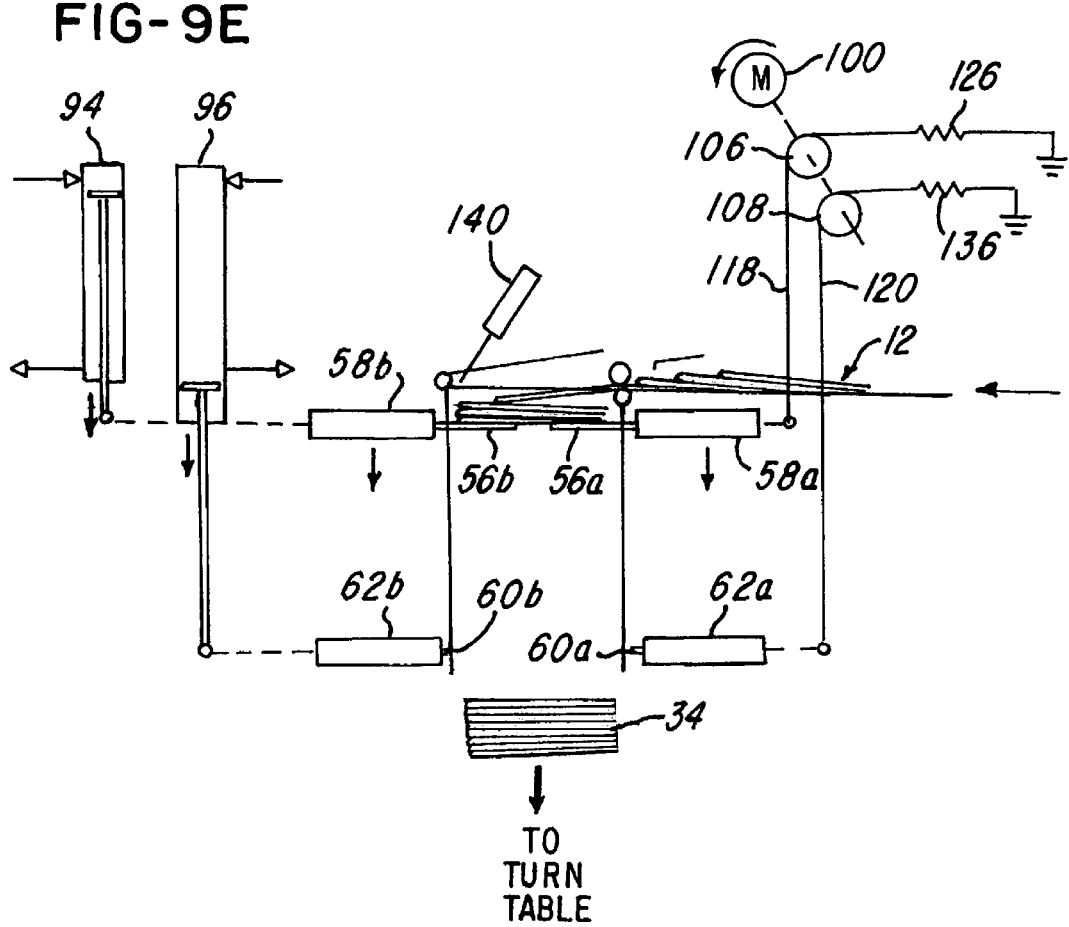

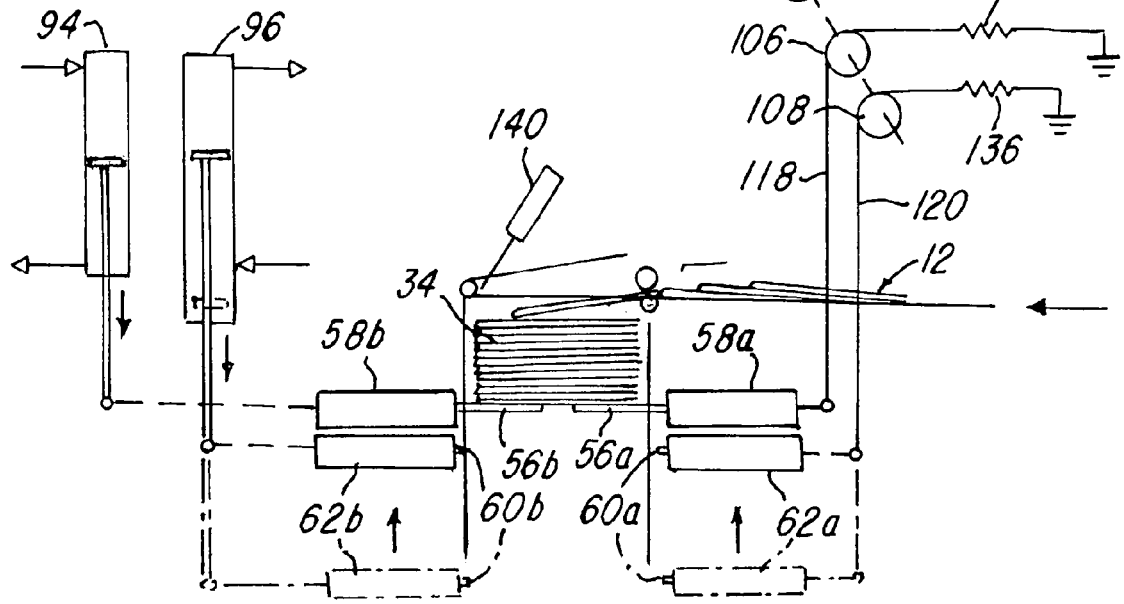
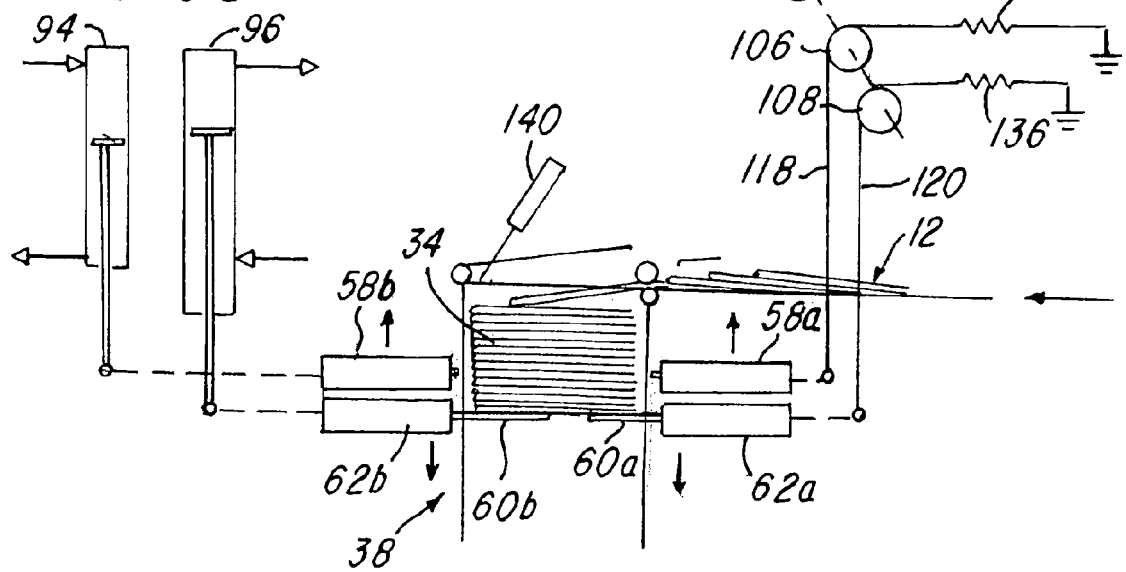

STACKER, STACKING SYSTEM OR ASSEMBLY AND METHOD FOR STACKING

BACKGROUND OF THE INVENTION

1. Field of the Invention

A stacker system, assembly and method for stacking printed materials, and more particularly, a stacking system, assembly and method that utilizes a drive control that permits driving at least one or a plurality of stacking supports at a precisely controlled first speed in a downward or descending direction and that permits free relatively uncontrolled movement in an ascending or upward direction.

2. Description of the Related Art

In the past, printing presses or other feeders would deliver printed materials in a shingled manner to a stacker that would stack the printed materials. The printed materials or products were, for example, journals, advertising brochures, newspapers, magazines and the like. The products were stacked in a stack, which contained sub-stacks that were displaced by 180°. The printed products usually had a fold, so a stacking of the printed products with a displacement of 180° was required so that the orientation and/or levelness of the stack is maintained even in higher product stacks. To perform such displacement, a rotary table was commonly used. The rotary table would receive a sub-stack and then be rotated approximately 180°, and then another sub-stack would be placed on top of the first sub-stack and so on, thereby maintaining the orientation and levelness of the stack relatively horizontal as the stack height grew.

The current designs for vertical movement of stacking grid units or compensating stackers, where two grid units are needed, in an upper stacking chamber of a stacker have either servo-controlled or vector-controlled motors. The servo-controlled or vector-controlled motor designs are expensive components and contribute to high manufacturing costs of the compensating stacker. These types of drivers are also slow and their machine failure recovery (i.e., the recovery time needed to move the grid units from a lower release position where the printed materials are released to the rotary table to an upper stacking position where they can begin receiving printed materials for stacking) is slow because the units were moved back into their home positions with the servo-motor for positioning referencing. These motors, while being accurate, are more expensive and difficult to maintain than other types of drivers, such as actuators or pneumatic cylinders. However, the other types of drivers are not as accurate and cannot be used where accurate control and speed are needed. Unfortunately, these other types of drivers, such as pneumatic actuators, do not accurately index at slow speeds which are required of conventional stackers which need to maintain a constant drop height and rate during a stacking process.

In some cross-stackers, the product flow, which is delivered in scale or shingled formation, is forwarded onto a first reception element or support in the form of a grating, through which a first sub-stack is formed. One or more of further gratings are arranged beneath this grating with all the gratings being stationary in the vertical direction. After the product stack, which is located on the upper grating, has reached a certain height, this grating, which is designed in two parts, is open, through which the product stack falls onto the grating lying below it. After a further height increase of the stack through the supply of printed products, this grating is also open through which the product stack falls onto a further grating or into a rotational basket or rotary table which rotates the stack located therein by 180° as mentioned earlier.

Another approach is illustrated in U.S. Pat. No. 6,149,149 which shows an alternating cross stacker for paper products that utilizes a first reception element on which paper products to be stacked are collected and a further reception element. Rotation devices were arranged beneath the reception elements. The reception elements were vertically displaceable such that the stack that is formed on the first reception element is transferred directly to the rotation device or rotary table with a very small fall height. To achieve this, the reception elements, which comprised a pair of opposing fingers or grates, of the lower reception unit would open after delivery of its sub-stack and the upper reception element would receive printed materials which would be stacked thereon and would descend through the opening between the first reception element or grates. The stack on the first reception element would then be delivered directly to the rotary table, while the grates of the second reception element would be moved above the first reception element, which is now below the second reception element, where it may begin receiving and stacking printed materials. This type of stacker was commonly referred to as an alternating stacker and U.S. Pat. No. 6,149,149 issued to Gammerler A G was typical of this type of stacker.

One drawback of the prior art stackers mentioned is they commonly used two motors with drives and required a close coupled connection of each grid section with a motor. This resulted in high costs because of the two motors, drives and the like.

What is needed, therefore, is a system, method and means for precisely controlling the driven movement, especially the downward driven movement, of the grid, finger units or product support.

SUMMARY OF THE INVENTION

It is, therefore, one object of one embodiment to provide a stacker system and method for driving at least one printed material support and second printed material support at a first speed that is precisely controlled in a first direction and that is permitted to move at a second speed in a second direction that is opposite the first direction.

Another object of the invention is to enable the first and second material supports to be driven downward at a first speed and upward at a second speed, wherein the second speed is greater than the first speed.

Still another object of the invention is to provide a drive control that can be utilized with an alternating stacker of the prior art or a non-alternating cross-stacker.

Still another object of the invention is to provide a device control that enables the utilization of actuators or cylinders, such as pneumatic or hydraulic cylinders, to drive product supports in combination with a driver, means or apparatus for accurately indexing the product supports at a first speed in a downward direction in order to maintain a constant drop height, while permitting the use of the actuators or cylinders to quickly raise printed material supports at relatively higher speeds.

In one aspect, one embodiment comprises a stacker for stacking printed materials, the stacker comprising a first support, a second support, at least one motor, at least one driver coupled to the first support and the second support for driving the first support and the second support substantially vertically, and a drive control for coupling the at least one motor to the first support and the second support, the drive control permitting the at least one driver to drive at least one of the first support or the second support at a first speed that is controlled by the at least one motor.

In another aspect, another embodiment comprises a stacker for stacking printed materials for transfer to a downstream station, the stacker comprising a first support, a second support, at least one motor coupled to a shaft, a drive control mounted on the shaft and coupling the shaft to the first support and the second support, a first support driver for driving the first support between a first support home position and a first support release position, a second support driver for driving the second support between a second support home position and a second support release position, the drive control enabling the first and second support drivers to drive the first support and the second support, respectively, downward at a first speed that is controlled by the at least one motor and to drive the first support and the second support freely upward without any speed control of the at least one motor.

In yet another aspect, another embodiment comprises a stacking system for stacking printed materials received from a feeder and feeding the stacked printed materials to a downstream station, the stacker comprising a first finger unit having a first pair of fingers and a first finger drive for driving the first pair of fingers between a first finger unit open position and a first finger unit closed position, a second finger unit having a second pair of fingers and a second finger drive for driving the second pair of fingers between a second finger unit open position and a second finger unit closed position, a first finger unit driver coupled to the first finger unit for driving the first finger unit between a first finger unit home position and a first finger unit release position, a second finger unit driver coupled to the second finger unit for driving the second finger unit between a second finger unit home position and a second finger unit release position, a drive motor coupled to a shaft for driving the shaft at a first speed, a first one-way pulley or gear mounted on the shaft, a second one-way pulley or gear mounted on the shaft, a first timing belt, chain or rack engaging the first one-way pulley or gear and coupled to the first finger unit, and a second timing belt, chain or rack engaging the second one-way pulley or gear and coupled to the second finger unit, at least one stacking height sensor for sensing a stacking height of printed materials that are stacked on at least one of a first finger unit or a second finger unit and generating a stacking height signal in response thereto, and a programmable logic controller for controlling the first finger unit driver, the second finger unit driver, the first finger drive of the first finger unit, the second finger drive of the second finger unit, and the drive motor, the programmable logic controller receiving the stacking height signal and energizing the drive motor to drive the shaft at the first speed, the first and second one-way pulleys permitting the first finger unit driver and the second finger unit driver to drive the first finger unit and the second finger unit, respectively, in a first direction at a first speed controlled by the drive motor and permitting movement in a second direction opposite the first direction at a second speed that is not controlled by the drive motor.

These and other objects and advantages of the invention will be apparent from the following description, the accompanying drawings and the appended claims.

BRIEF DESCRIPTION OF THE ACCOMPANYING DRAWINGS

FIGS. 9A-9G illustrates a stacking sequence in accordance with one embodiment.

DETAILED DESCRIPTION OF THE PREFERRED EMBODIMENTS

Figure 1:
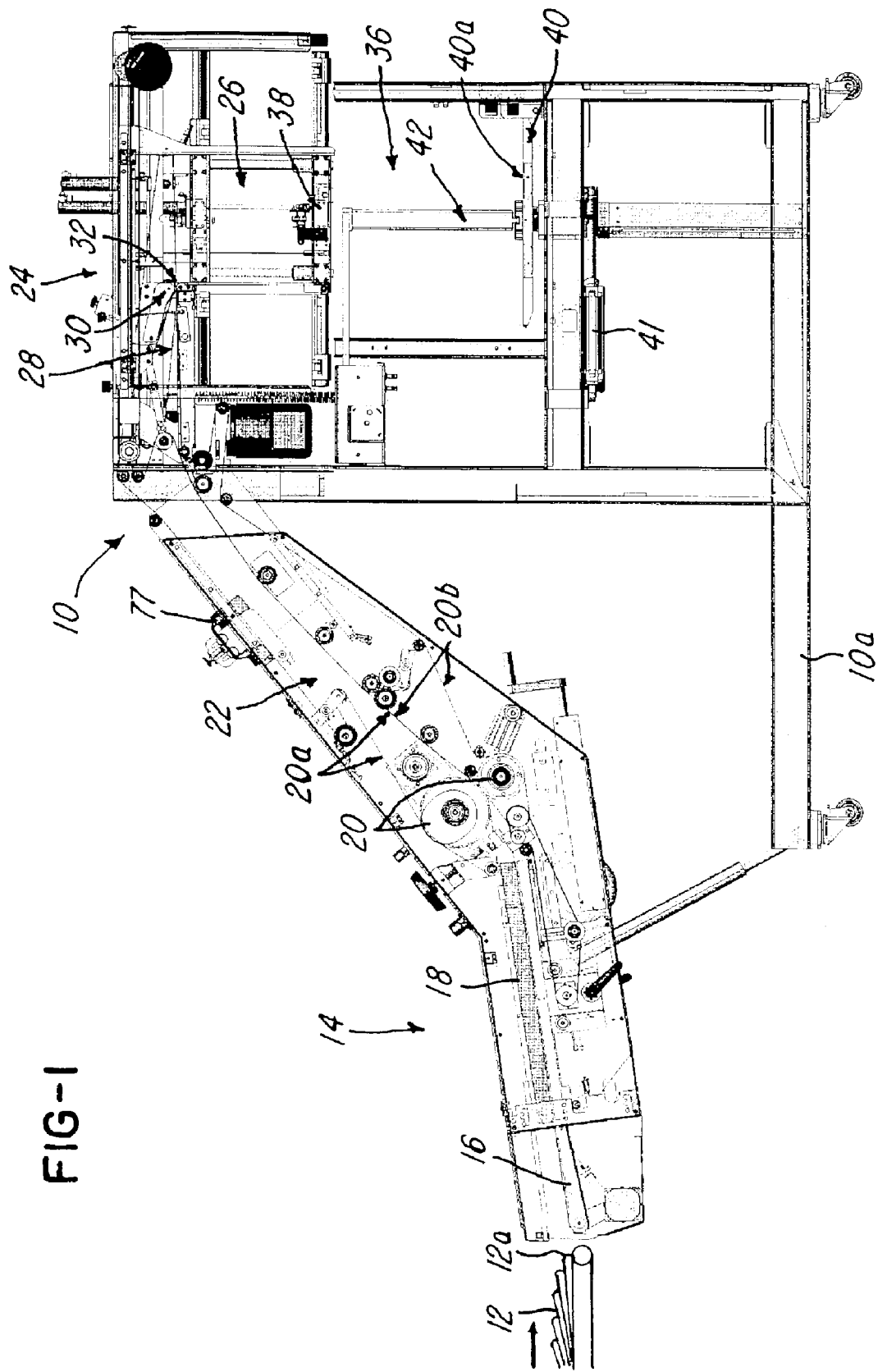
FIG. 1 is a plan view of an illustrative embodiment of one form of the invention.

Referring now to FIGS. 1-10, a stacking system or stacker 10 and method are shown for stacking a plurality of printed materials 12, such as printed materials that are received from a printing press (not shown). In the illustration being described, the printed materials 12 FIG. 1) are provided to the stacker 10 in a shingled manner as shown.

The stacker 10 comprises a frame 10a onto which components are coupled to or mounted. The stacker 10 comprises a conventional feeding unit 14. The feeding unit 14 comprises a gate 16, a side jogger 18 for alignment and a crusher/pressing unit 20 for flattening the folded edges 12a of the printed materials 12 and delivering them to a stacking area 26 of the stacker 10. The feeding unit 14 comprises an inclined section 22 for feeding the plurality of printed materials 12 to a stacking unit or assembly 24 that is mounted to a frame 10a of the stacker 10. Note that the crusher/pressing unit 20 and the inclined section 22 comprise a plurality of belts 20a and 20b to transport the plurality of printed materials 12 and also deliver the plurality of printed materials 12 over a belt support 29 (FIG. 4) to a stacking area 26 (FIG. 1) of the stacking unit or assembly 24, which will now be described.

At the end of the inclined section 22, the stream of the plurality of printed materials 12 are delivered by the first and second belts 20a and 20b to the stacking area 26 and enter horizontally or substantially horizontally over a conveying section 28 before it reaches the stacking area 26 of the stacking unit or assembly 24. As is conventionally known, the horizontal conveying section 28 comprises a conventional gapper unit 30, which separates the shingled stream into a plurality of individual printed materials 12 before they enter the stacking area 26. A conventional nip roller and stabilization assembly 32 ensures the transport and delivery of each of the plurality of printed materials 12 into the stacking area 26 of the stacker 10.

The plurality of printed materials 12 are stacked by the novel stacking unit or assembly 24 in the manner described later herein relative to FIGS. 9A-9G to provide a stack 34 of the plurality of printed materials 12. As will be described in greater detail later herein, when the stack 34 of the plurality of printed materials 12 reaches a predetermined maximum stack level, the stacking unit or assembly 24 drives the stack 34 to a release position 38 (FIGS. 1 and 9G) whereupon the stack 34 of the plurality of printed materials 12 may be released to a downstream station 36. In the embodiment being described, the downstream station 36 comprises a conventional rotary table or turntable 40 having a table 40*a* for receiving a plurality of the stack 34 and a pushing unit 42 for pushing the plurality of stack(s) 34 out of a lower stacking area 44 associated with the turntable 40. It should be understood that the rotary table or turntable 40 and pushing unit 42 are conventional and adapted to collect multiple stacks 34 from the stacking area 26 after they have been stacked by the stacking unit or assembly 24. In a manner conventionally known, the rotary table or turntable 40 is adapted to turn the stacks 34 and substacks a predetermined number of degrees, such as 180° in the illustration being described, for offset collection of multiple stacks 34. The pushing unit 42 pushes the collected amount of stacks 34 onto a delivery belt in a manner conventionally know.

Referring now to FIGS. 2-9G, the stacking unit or assembly 24 will now be described. For ease of illustration and description, the stacking unit or assembly 24 of the stacker 10 is shown exploded, broken away or fragmented from frame 10*a* (FIG. 1) of the stacker 10 and without the other components, such as the rotary or turntable 40 and the feeding unit 14. Also, for ease of illustration and description, the plurality of belts 20*a* and 20*b* and other components of the feeding unit 14 are not shown so that details of the stacking unit or assembly 24 may be illustrated and understood.

The stacking unit or assembly 24 comprises a generally rectangular frame 46 that is integral with or coupled to the frame 10*a* of the stacker 10, but again, is shown separate therefrom for ease of illustration. The generally rectangular frame 46 comprises an upper generally rectangular and horizontal frame member 46*a* and a lower generally rectangular and horizontal frame member 46*b* which are joined by vertical frame members 46*c* and 46*d* as shown.

Figure 3:
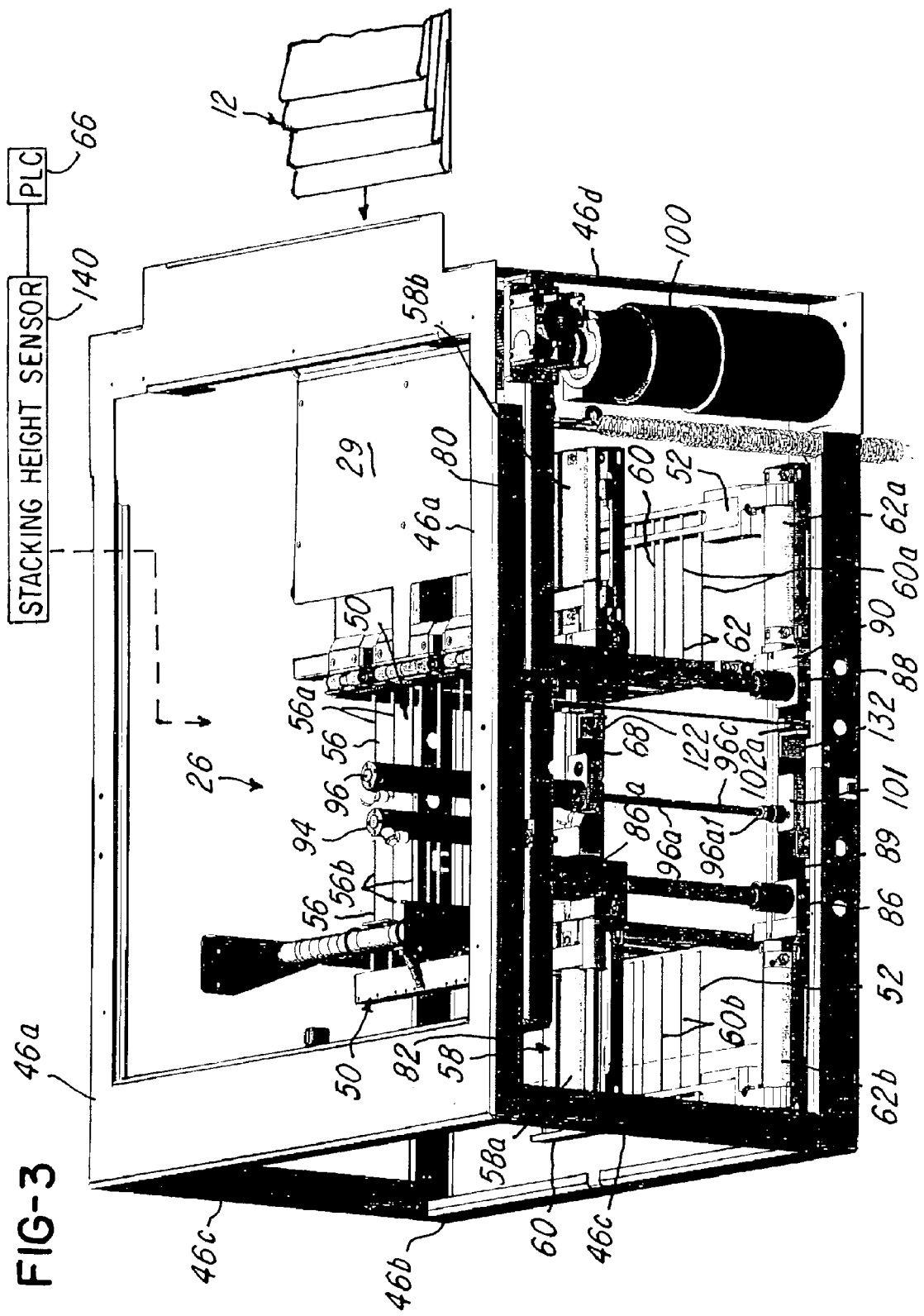
FIG. 3 is a perspective view of the stacking unit or assembly shown in FIG. 2.
Figure 4:
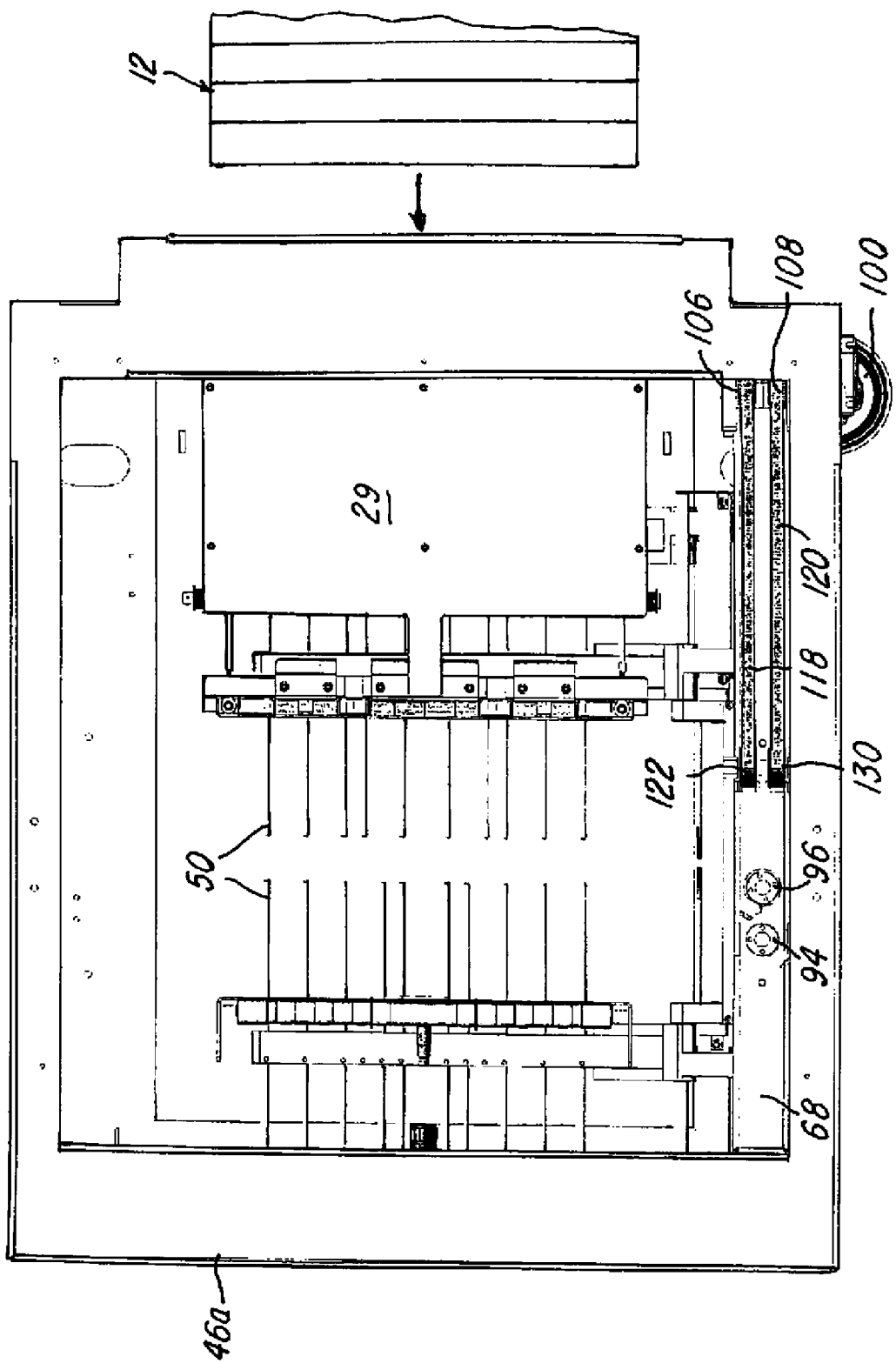
FIG. 4 is a plan view of the stacking unit or assembly shown in FIG. 2.

The stacking system or assembly 24 comprises a first support, first grid or first finger unit 50 and a second support, second grid or second finger unit 52 (FIG. 3). The first finger unit 50 comprises a plurality of first fingers 56 comprising a first pair of fingers, namely, a first set of fingers 56*a* and a generally opposed second set of fingers 56*b*. The first finger unit 50 also comprises a first finger drive 58 for driving the first and second sets of fingers 56*a* and 56*b* between a first finger unit open position (illustrated in FIG. 9A) and a first finger unit closed position (illustrated in FIGS. 3 and 7) in a manner described later herein.

Likewise, the second finger unit 52 comprises a second plurality of fingers 60 comprising a second pair of fingers, namely, a third set of fingers 60*a* and a generally opposed fourth set of fingers 60*b*. The second finger unit 52 also comprises a second finger drive 62 for driving the third and fourth set of fingers 60*a* and 60*b* between a second finger unit open position (illustrated in FIGS. 3 and 7) and a second finger unit closed position (illustrated in FIGS. 9A and 9B, for example) in a manner described later herein. The function and operation of the first and second finger units 50 and 52 and their associated first and second finger drives 58 and 60, respectively, will be described later herein.

The first and second finger units 50 and 52 and their associated first finger drive 58 and second finger drive 62, respectively, function to horizontally drive the sets of fingers 56*a*, 56*b* and 60*a*, 60*b* open and closed in a conventional manner and similar to that shown in U.S. Pat. No. 6,149,149 issued Nov. 21, 2000 to Gammerler A G which is incorporated herein by reference and made a part hereof. It should be understood that the first finger drive 58 and second finger drive 62 each comprise a conventional actuator, solenoid, cylinder (hydraulic or pneumatic) or drive motor. In the illustration, the first and second finger drives 58 and 62 are pneumatic cylinders 58*a*, 58*b* and 62*a*, 62*b*, as shown in FIGS. 3 and 8. The cylinders 58*a*, 58*b*, 62*a* and 62*b* each have an associated valve 115 and 113 (FIG. 8), but which are not shown in the FIGS. 1-7 for ease of illustration. The cylinders 58*a*, 58*b*, 62*a* and 62*b* and associated valves 115 and 113 are coupled to and under the operation and control of a programmable logic controller or PLC 66 (FIG. 8) as described later herein. The function and operation of the first and second finger drives 58 and 62 is also described later herein. For ease of illustration, the various air supply conduits, supply lines or tubing 111 (FIG. 8) for delivering air to the cylinders 58*a*, 58*b*, 62*a* and 62*b* are also not shown in FIGS. 2-7 and FIGS. 9A-9G, which is described in more detail later herein.

The first pair or set of fingers 56*a* and 56*b* and the second pair or set of fingers 60*a* and 60*b* are driven toward and away from each other by the first finger drive 58 and the second finger drive 62, respectively, in a manner conventionally known. In this regard, the cylinders 58*a*, 58*b* of the first finger drive 58 drive the first pair or set of fingers 56*a* and 56*b*, respectively, toward and away from each other between a first finger unit closed or stacking support position and a first finger unit open or release position. Likewise, the cylinders 62*a*, 62*b* of the second finger drive 62 drive the second pair or set of fingers 60*a* and 60*b*, respectively, towards and away from each other between a second finger unit closed or stacking support position and a second finger unit open or release position as described later herein. As is conventionally known, the first and second finger units 50 and 52 are in the closed position when they receive the plurality of printed materials 12 or the stack 34 as described herein. The first and second set of fingers 56*a*, 56*b* and 60*a*, 60*b* move from the first and second finger unit closed or stacking support position away from each other to the first and second finger unit open or release position, thereby releasing the stack 34 from the first finger unit 50 to the second finger unit 52 or from the second finger unit 52 to the table 40*a* of the rotary table 40. For ease of illustration, the components of the cylinder 58*b* and the second pair or set of fingers 56*b* of first finger unit 50 will be described relative to FIG. 7 with it being understood that the other cylinders 58*a*, 62*a* and 62*b* and sets of fingers 60*a* and 60*b* are similarly constructed.

Figure 7:
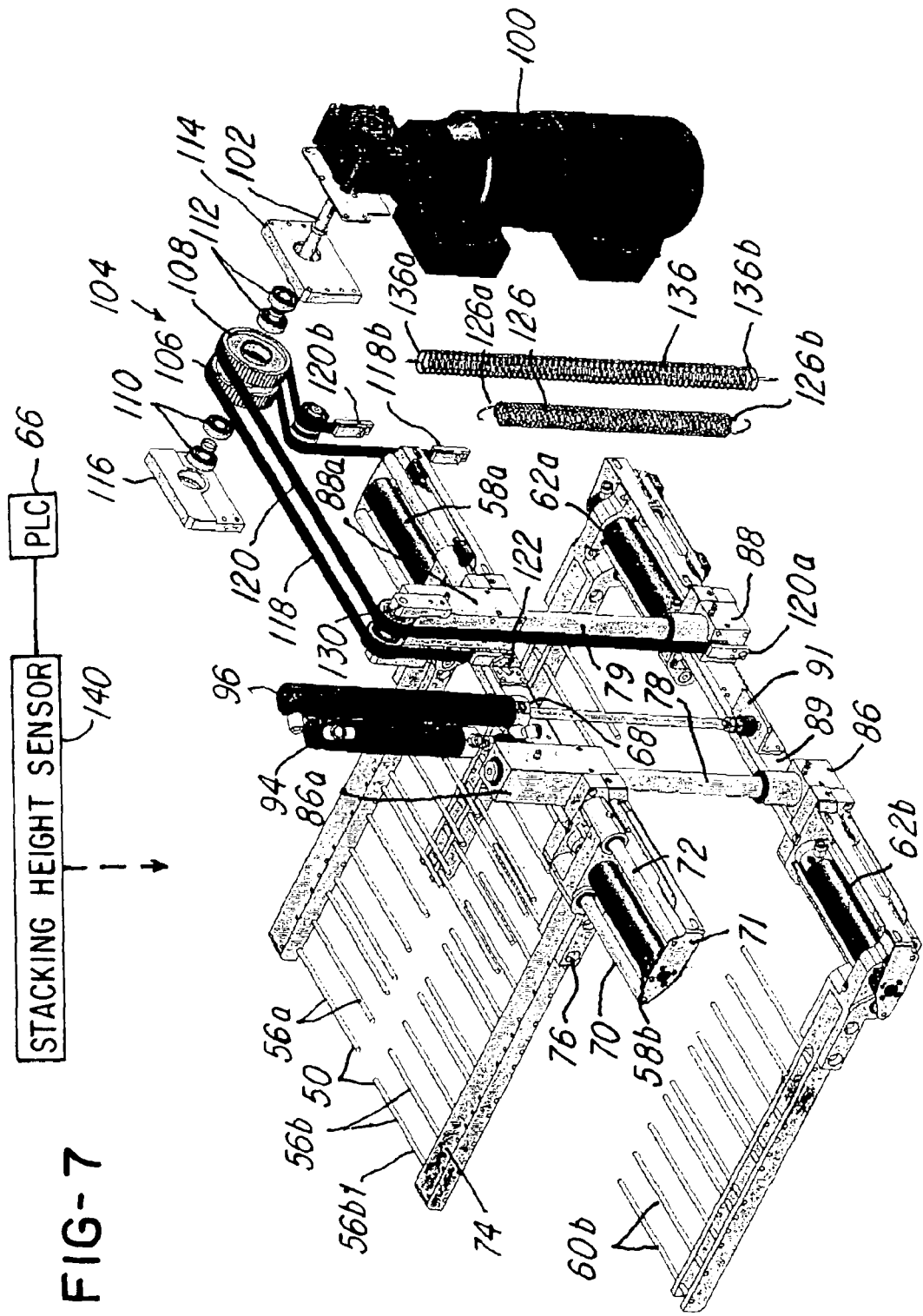
FIG. 7 is an exploded view illustrating various parts of the stacking unit or assembly shown in FIG. 2, without the frame and various other components for ease of illustration.
Figure 8:
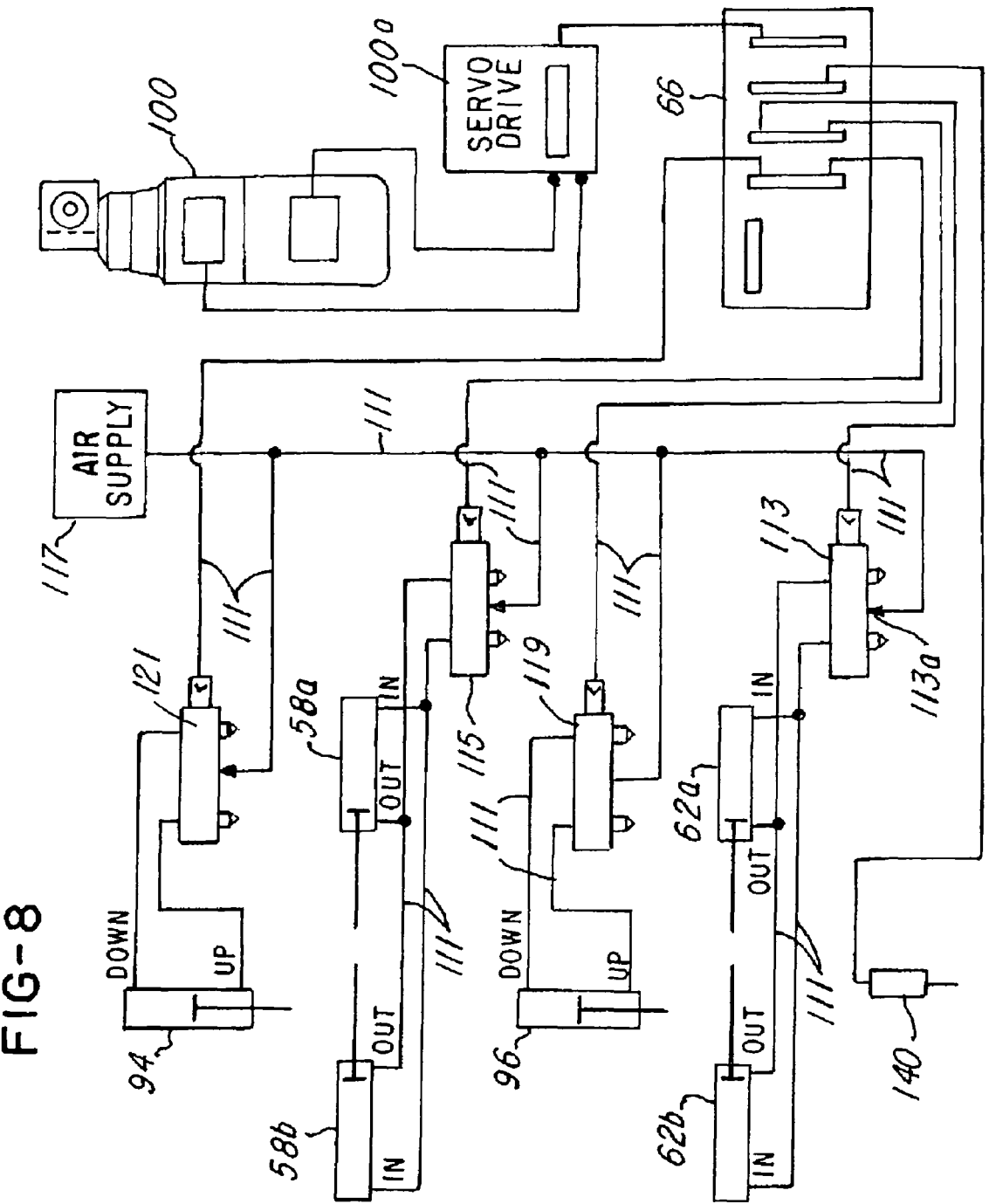
FIG. 8 is a schematic view of various drivers, valves and a PLC used in one embodiment.
Figure 10:
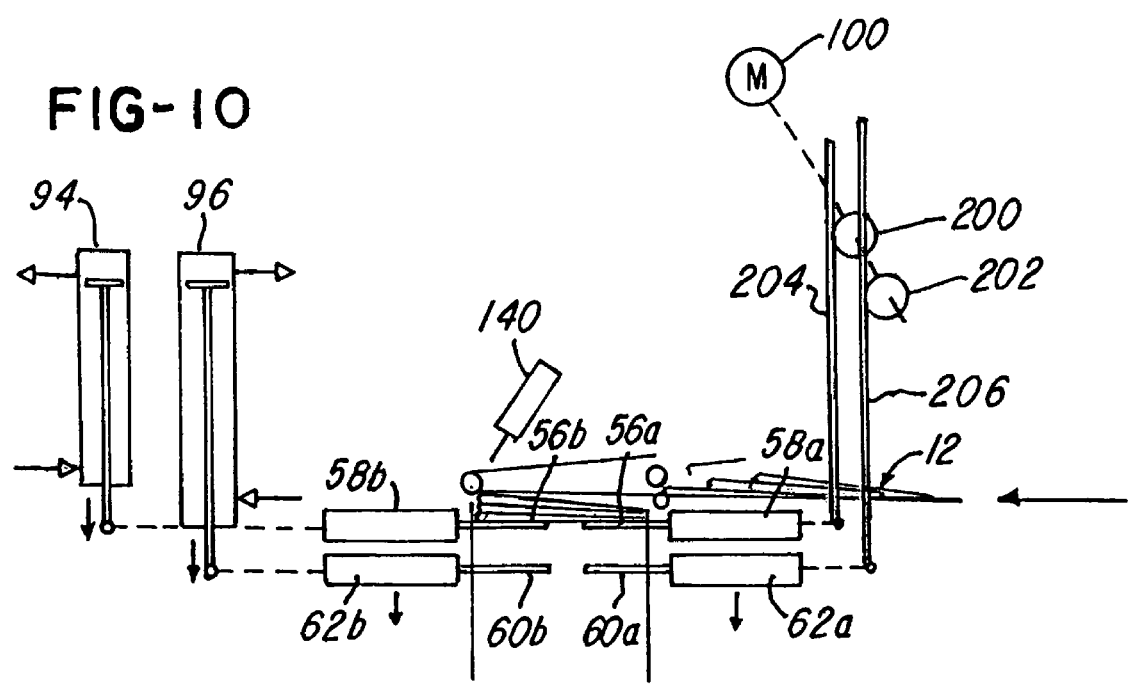
FIG. 10 is a schematic view of another embodiment showing the use of gears and driven racks in place of pulleys and timing belts.

FIG. 7 is an enlarged and exploded view showing various components in the stacker system or assembly 24. Note in FIG. 7 that the cylinder 58*b* comprises a cylinder support bracket 59 having a pair of guides 70 and a support housing 71. The cylinder support bracket 59 is mounted to a frame member or support 68 of the stacking assembly 24. A sleeve bearing assembly 72 is slidably mounted on the guides 70 and have a finger support 74 mounted thereto, integral therewith or fastened thereto by suitable fasteners such as screws 76. The plurality of fingers 56*b* are fastened, secured or mounted to the support 74 by conventional means, such as a weld, adhesive or by providing threaded rods or fingers 56*b*1 that are threadably received in threaded openings (not shown) in the support 74. It should be understood that the cylinders 58*a*, 58*b* cooperate to drive the first and second pairs or sets of fingers 56*a*, 56*b*, respectively, in a horizontal plane toward and away from each other and between the first finger unit closed position and the first finger unit open or release position mentioned earlier. The second finger unit 52 and its associated cylinders 62*a*, 62*b* and the first and second pairs or sets of fingers 60*a* and 60*b* operate in substantially the same manner.

Figure 2:
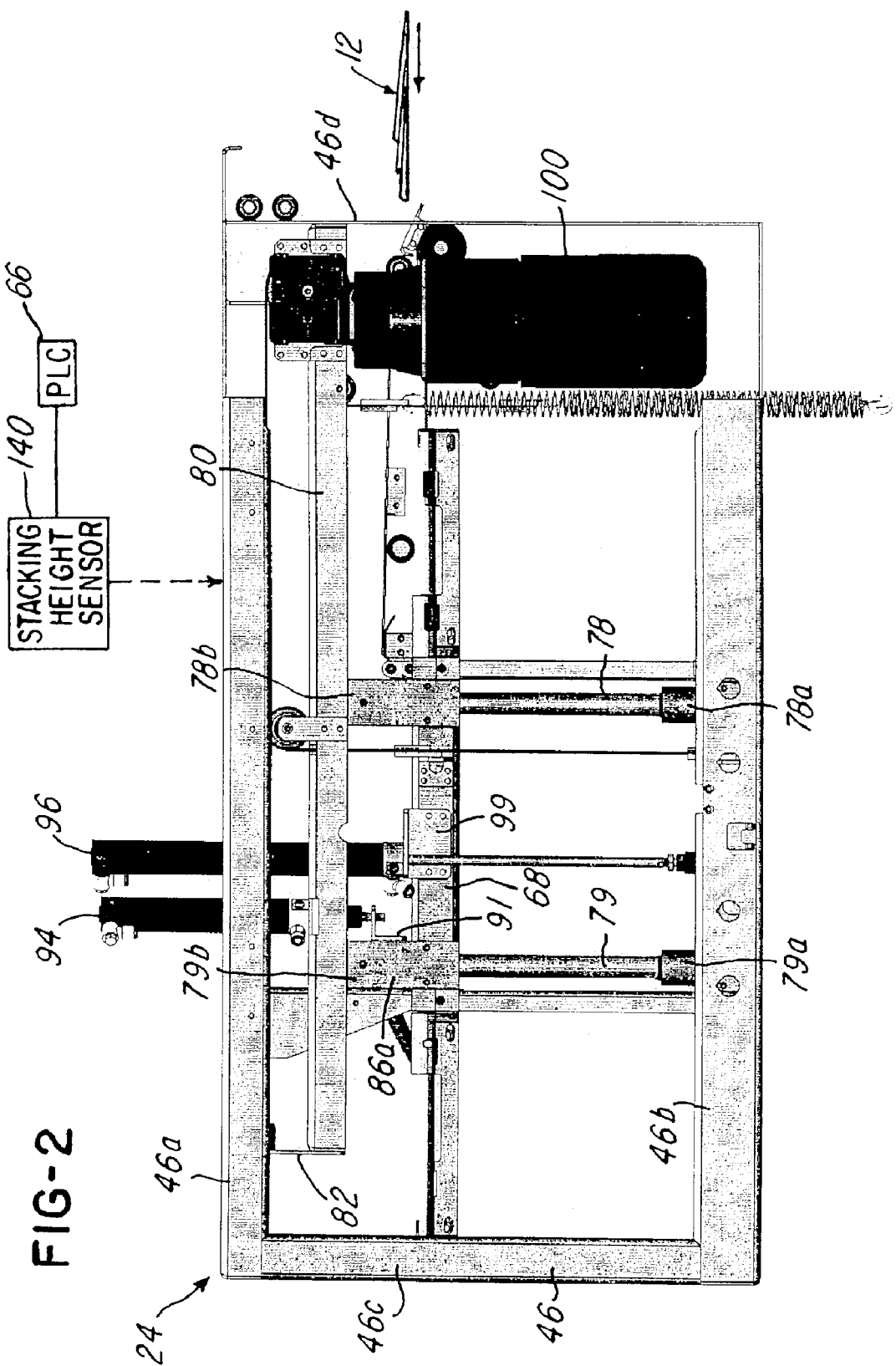
FIG. 2 is a view of a stacking unit or assembly used in the stacker in the embodiment shown in FIG. 1.

As mentioned, the first and second finger units 50 and 52 also move vertically (as viewed in FIGS. 1 and 7). Note that to maintain alignment of the first and second finger units 50 and 52 during such vertical movement, a pair of guide rail supports or guide rails 78 and 79 are provided. In the illustration being described, the rails 78, 79 have first ends 78a, 79a (FIG. 2), respectively, that are secured to the bottom frame member 46c (FIGS. 2 and 6) and first and second ends 78b and 79b, respectively, secured to a cross-frame member bracket 80, as shown in FIG. 2. Note that the cross-frame bracket 80 has a first end 80a that is secured to a frame member or bracket 82 that is secured or integral with frame member 46a of the stacking unit or assembly 24. A second end 80b of cross-frame bracket 80 is secured to the frame member 46d which is part of the generally rectangular frame 46 mentioned earlier herein.

The guide supports or rails 78 and 79 facilitate supporting the cross-frame bracket 80 a predetermined distance from the bottom support frame member 46c, as shown, and it also facilitates supporting several of the components, such as the first and second finger units 50 and 52 of the stacking unit or assembly 24 as will be described later herein.

Note that each of the first and second finger units 50 and 52 comprise a pair of guide sleeve bearings 86a and 88a that are slidably mounted on the guide rails 78 and 79 as shown. For example, the first finger unit 50 comprises a guide sleeve bearing 86a mounted to the support 68 adjacent the cylinder support bracket 59 (FIG. 7). Each guide sleeve bearing 86a and 86b is slidably mounted on its respective guide support or rail 78 or 79, respectively, which enables the first and second finger units 50 and 52 to precisely move vertically in the stacking area 26.

Thus, it should be understood that the first finger unit 50 and associated first pair or set of fingers 56a and 56b and second finger unit 52 and associated second pair of fingers 60a and 60b are mounted on their respective supports 68 and 89, and the guide sleeve bearings 86 and rails 78 and 79 enable them to be driven vertically upward and downward as described later herein. The first and second pair of fingers 56a, 56b and 60a, 60b can also be driven horizontally as mentioned earlier and both vertical and horizontal movements are under the control of the PLC 66 described later.

Note that the stacking unit or assembly 24 further comprises a pair of vertical stacker walls 90 and 92 (FIG. 5) that comprise a plurality of elongated slits or openings, such as openings 92a, through which the pairs of fingers 56b and 60b may pass during vertical and horizontal movement thereof. The stacker walls 90 and 92 facilitate guiding the printed materials into the stacking area 26 to form the stack 34.

Referring now to FIGS. 2-7, the stacking unit or assembly 24 comprises a cylinder or first finger unit driver 94 that is coupled to the support 68 for driving the first finger unit 50 and its associated pair or set of first fingers 56a and 56b between a first finger unit home position, during which the first pair of fingers 56a and 56b may receive a stack 34 of the plurality of printed materials 12 where the first and second pairs of fingers 56a and 56b are in the closed position illustrated in FIG. 3, and a first finger unit release position when the first and second pairs of fingers 56a and 56b may be opened to release any stack 34 thereto. As mentioned, when the first pair of fingers 56a and 56b are opened, the stack 34 of printed materials 12 may descend from the first finger unit 50 to the second finger unit 52 when the second pair of fingers 60a and 60b are in the closed position illustrated, for example, in FIG. 9B and as described later herein. When the second pairs of fingers 60a and 60b are open, the stacks 34 may descend onto the downstream station 36, such as the rotary table 40a (FIG. 1).

Figure 5:
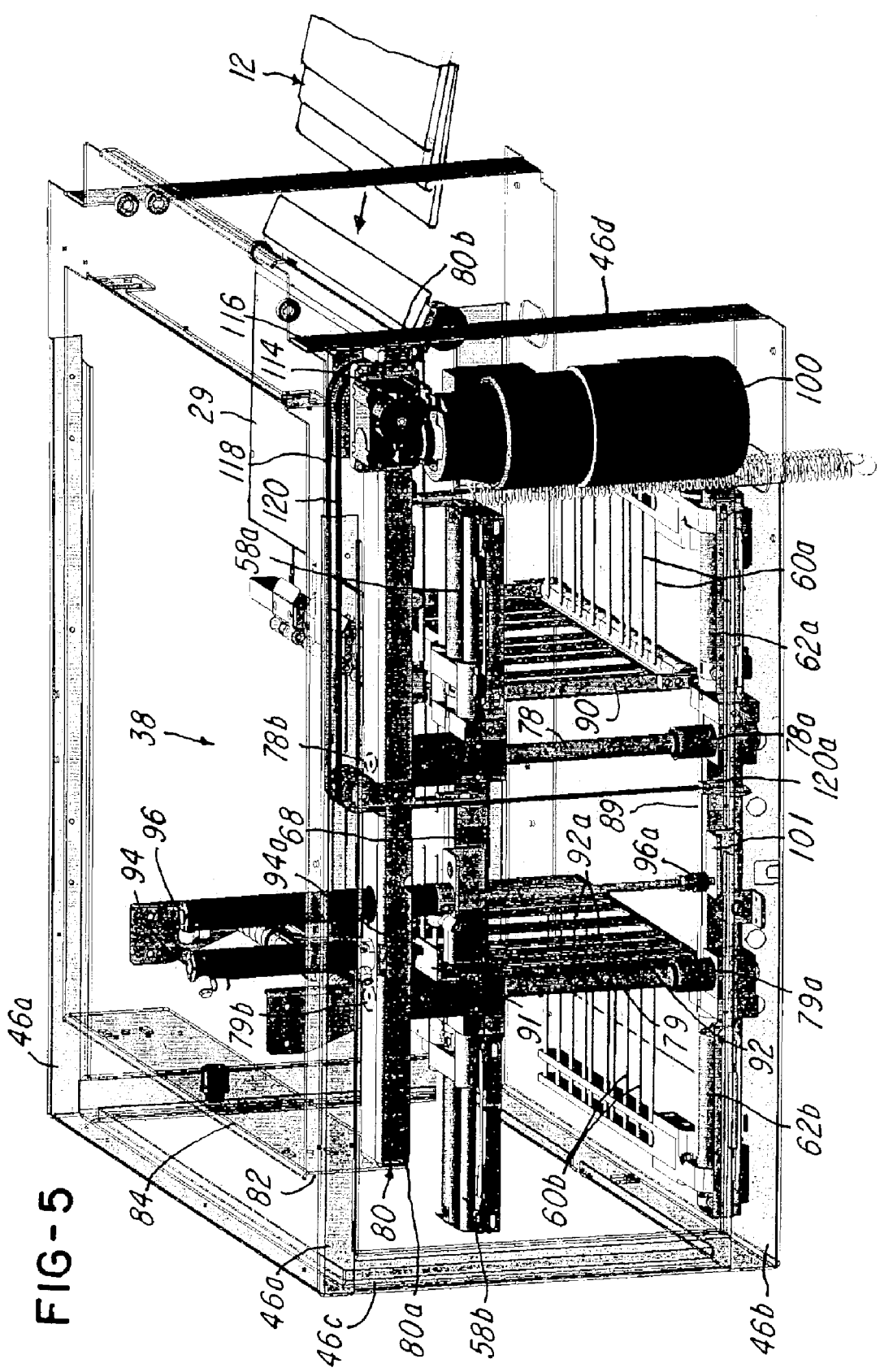
FIG. 5 is another perspective view of the stacking unit or assembly shown in FIG. 2, illustrating other features of the embodiment.

The stacking unit or assembly 24 further comprises a cylinder or first finger unit driver 96 that is also mounted on the cross-frame bracket 80 (FIG. 5) and has an actuator arm 94a that is coupled to the guide sleeve bearing 86 via the bracket 91 (FIG. 2) so that the cylinder 94 can drive the frame member 68 and the first finger unit 50 vertically (as viewed). It is important to note that the frame member or support 68 of the first finger unit 50 comprises the bracket 99 (FIG. 2) that is secured to the frame member or support 68 and receives and supports the cylinder 96 as shown. Thus, note that the second finger unit 52, by virtue of the mounting of the cylinder 96 being mounted on the first finger unit 50, travels or follows the travel of first finger unit 50 when the cylinder 96 is not actuated. Each of the cylinders 94 and 96 comprise a pressure reducer (not shown) for the down pressure of cylinders 94 and 96, so the force on the timing belts or chains 118 and 120 is reduced to a minimum. The air pressure on cylinder 94 is adjusted and set to a higher pressure than the air pressure on cylinder 96 (FIG. 5). This differential air pressure is needed for cylinder 96 (due to the one way bearing 112 that locks to the motor shaft 102) so as not to push up cylinder 94 and the first finger unit 50 when both cylinders 94 and 96 are actuated downward. When the cylinder 94 pushes the first support or finger unit 50 upward, there will be help from cylinder 96 until the first support or finger unit 50 has returned to its home position. Another generally L-shaped bracket 101 (FIGS. 3 and 5) is mounted to the support 89 of the second finger unit 52 and is coupled to an end 96a1 of the actuator arm 96a of the second finger unit driver 96 as shown.

In the illustration being described, the second finger unit driver 96 drives the support 89 vertically between a second finger unit home position, illustrated in FIG. 9A, and a second finger unit release position, illustrated in FIG. 9E. The first and second finger unit drivers 94 and 96 may be pneumatic or hydraulic cylinders, actuators, solenoids or drive motors. In the illustration, the first and second finger unit drivers 94 and 96 are pneumatic cylinders, such as the model number DNC or DSN available from Festo Corp. of Hauppauge, N.Y. As mentioned earlier, the air supply conduits 111 to the cylinders 94 and 96 and associated valves are illustrated and described later relative to FIG. 8, but are not shown in FIGS. 2-7 for ease of illustration. The control circuit and schematic layout of the cylinders 58a, 58b, 62a, 62b, 94 and 96 and other parts will now be described relative to FIG. 8.

As best illustrated in FIG. 8, the cylinders 62a and 62b are coupled to and under the control of a valve 113 that, in turn, is coupled to the PLC 66 as shown. An inlet of the valve 113a is coupled to an air supply 117 via supply lines 111, which supplies air to each of the cylinders 58a, 58b, 62a, 62b, 94 and 96 through their respective valves in a manner conventionally known. The cylinders 58a and 58b are coupled to the valve 115, which is also coupled to and under the control of the PLC 66. The valve 115 is also coupled to the air supply 117 as shown in FIG. 8. Similarly, the cylinder 94 is coupled to the valve 121 which is coupled to the air supply 117 and also coupled to and under the control of the PLC 66 as shown in FIG. 8, and the cylinder 96 is coupled to the valve 119 which is coupled to the air supply 117 and also coupled to and under the control of the PLC 66 as shown in FIG. 8. The manner and operation of the various cylinders 58a, 58b, 62a, 62b, 94 and 96 will be described later herein. The various supply lines 111 (FIG. 8), which couple the air supply 117 to the various valves 113, 115, 119 and 121 is shown schematically in FIG. 8.

Figure 6:
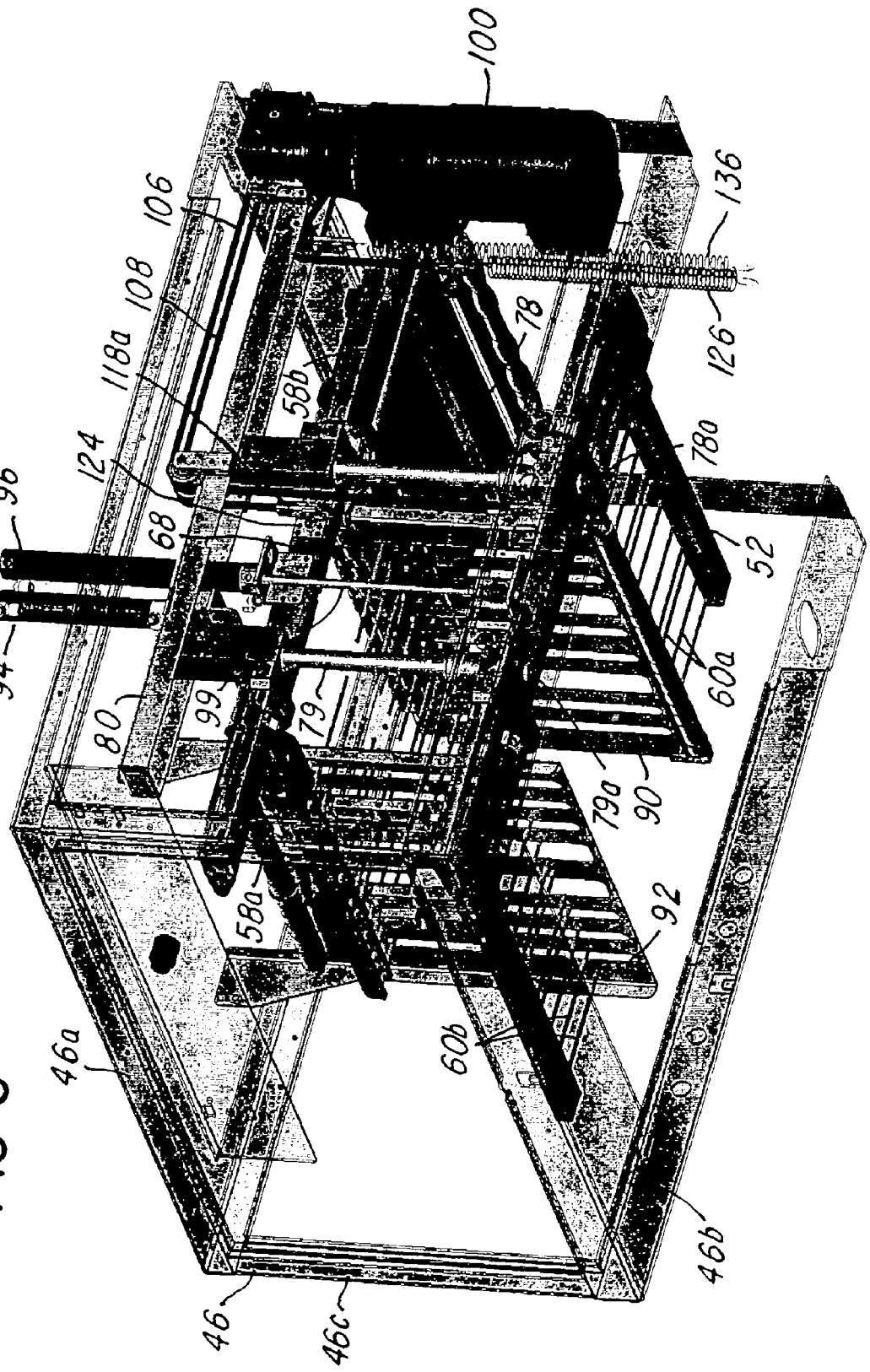
FIG. 6 is another perspective view of the stacking unit or assembly shown in FIG. 2, illustrating other features of the embodiment.

Referring now to FIGS. 5-7, note that the stacking unit or assembly 24 further comprises a servo drive motor 100 that rotatably drives a drive shaft 102. In the illustration being described, the drive motor 100 comprises a servo-drive 100a (FIG. 8) that is coupled to the PLC 66, which energizes the drive motor 100 to rotatably drive the drive shaft 102 at a first or predetermined speed. As illustrated in the exploded perspective view in FIG. 7, the stacking unit or assembly 24 comprises a drive control 104 having a first one-way pulley 106 and a second one-way pulley 108. The first and second one-way pulleys 106 and 108 have one-way bearings 110 and 112, respectively. The first and second one-way pulleys 106 and 108 are housed between two side plates 114 (FIG. 5) and 116 that are secured and mounted on the cross-frame bracket 80.

An important feature of the embodiments being described is that the first and second one-way pulleys 106 and 108 comprise the one-way bearings 110 and 112, respectively, and these one-way bearings 110 and 112 enable the drive motor 100 to drive and control the rotational movement of the shaft 102 and one-way pulleys 106 and 108 in a counterclockwise direction (as viewed in FIG. 7) at the first speed which is controlled and established by the PLC 66, while permitting unrestricted and free rotational movement of the one-way pulleys 106 and 108 in the clockwise direction. Although the embodiment described illustrates the one-way pulleys 106 and 108 comprising the one-way bearings 110 and 112, it should be understood that other means, such as one-way clutches (not shown), for providing one-way rotational movement in the manner described herein could be used as well.

Note that the stacking unit or assembly 24 further comprises a first timing belt 118 that engages the first one-way pulley 106 and engages a guide pulley 122 (FIG. 7) and has an end 118a (FIG. 6) that is secured to a bracket 124 that is mounted by conventional means, such as by a weld, screws or fasteners, to the support 68 as shown. A second end 118b of the timing belt 118 is secured to an end 126a (FIG. 7) of a spring 126, and a second end 126b of the spring 126 is secured to the frame 10a of the stacking unit or assembly 24. It should be understood that the spring 126 facilitates reducing the weight of the first finger unit 50 and to provide tension to the timing belt 118.

The stacking unit or assembly 24 further comprises a second timing belt or chain 120 that engages the second one-way pulley 108 and also engages a guide pulley 130 (FIG. 7) and has a first end 120a that is secured to a bracket 132 (FIG. 3) which in turn is secured to the support 89 by conventional means, such as by fasteners or screws. A second end 120b is secured to a first end 136a of a spring 136 which has its second end 136b secured to the frame 10a. As with the first spring 126, the second spring 136 facilitates reducing the weight of the second finger unit 52 and facilitates tensioning the timing belt or chain 120.

While the embodiment has been shown using timing belts 118 and 120 used with the first and second one-way pulleys 106 and 108, it should be understood that chains, gears or other suitable means could be used to couple the drive motor 100 to the first and second finger units 50 and 52. For example, in an alternate embodiment shown in FIG. 10, one or more of the first and second one-way pulleys 106 and 108 could be replaced with one or more one-way gears 200 and 202 mounted on the drive shaft 102, and the first and second timing belts 118 and 120 could be replaced with a racks 204 and 206 that are coupled to the first and second finger units 50 and 52. The operation of the system 10 would be substantially the same as the embodiment shown in FIGS. 1-9 as described herein, except this embodiment uses the one-way gears 200 and 202 in combination with the racks 204 and 206, respectively, to drive and control the movement of the first and second finger units 50 and 52.

Returning to the embodiment shown in FIGS. 1-9, it should be understood that the drive control 104 and the one-way pulleys 106 and 108 and their associated one-way bearings 110 and 112, respectively, permits the timing belts 118 and 120 to move freely at any desired speed in the upward or vertical direction and at the controlled first speed in the downward direction. This downward movement and rate of descent of the first and second finger units 50 and 52 is accurately controlled by the drive motor 100 which drives the shaft 102 at the first speed. This permits the first and second supports or finger units 50 and 52 to be driven downward by the at least one driver or motor 100 at the first speed that is accurately controlled by the motor 100 while the first and second finger unit drivers 94 and 96 can drive the first and second finger units 50 and 52, respectively, at a second speed that is independent of the speed at which the drive motor 100 drives the timing belts 118 and 120.

It should be understood that the first and second one-way pulleys 106 and 108 further permit the first finger unit driver 94 and second finger unit driver 96 to independently drive the first finger unit 50 and second finger unit 52 in the same or opposite directions. For example, the drive motor 100 may be energized by the PLC 66 to drive the shaft 102 at the first speed, while the first finger unit driver 94 drives the first finger unit 50 in a downward direction (as viewed in FIGS. 2-7). During this downward movement, the speed of the first finger unit 50 is controlled by the rotational movement of the shaft 102 which drives the first one-way pulley 106 and timing belt 118 at the first speed, thereby causing the first finger unit 50 to be driven at no greater or no less than the first speed. Substantially simultaneously, the second finger unit driver 96 may drive the second finger unit 52 in the same downward direction in which case that movement will also be controlled by the drive motor 100 and which will control the rate of descent of the second finger unit 52 to move at substantially the first speed. It should be understood, however, the PLC 66 may cause either the first finger unit driver 94 or second finger unit driver 96 to move the first finger unit 50 or second finger unit 52, respectively, in the upward vertical direction at the second speed. This free movement is enabled by the one-way pulleys 106 and 108 which comprise the one-way bearings 110 and 112, respectively. The advantages of this independent and controlled movement downward and free or uncontrolled movement upward will become apparent below relative to FIGS. 9A-9G, which will be described later herein.

Referring again to FIGS. 3 and 8, note that the stacking unit or assembly 24 comprises at least one stacking height sensor 140 that is coupled to the PLC 66 as shown. The at least one stacking height sensor 140 senses a stacking height or count of the printed materials 12 that are stacked on the first finger unit 50 and/or second finger unit 52 and generates a stacking height signal in response thereto. The PLC 66 receives the stacking height signal and controls the operation of the drive motor 100, via associated servo-drive 100a (FIG. 8), and the valves 113, 115, 119 and 121 in order to control the vertical movement of the first finger unit 50 and second finger unit 52 as well as the horizontal movement of the pairs of fingers 56a, 56b and 60a, 60b.

Advantageously, the first and second one-way pulleys 106 and 108 permit the first finger unit driver 94 and second finger unit driver 96 to drive the first finger unit 50 and the second finger unit 52, respectively, in a substantially vertical direction downward at the first speed that is controlled by the drive motor 100 and also permitting movement of the first finger unit 50 or the second finger unit 52 in a second direction that is opposite the first direction at the second speed that is not controlled by the drive motor 100. As will be described in more detail relative to FIGS. 9A-9G, the free upward movement enables the first and second finger unit drivers 94 and 96 of the stacking unit or assembly 24 to move the first and second finger units 50 and 52, respectively, upward at the second speed that is different from the first speed. This feature permits the first and second finger units 50 and 52 to be driven substantially vertically upward, as viewed in the figures, at the second speed which can be greater than the first speed in one illustrative embodiment. The drive control 104 also permits gross or relatively imprecise movement of the first finger unit 50 and second finger unit 52 by the first finger unit driver 94 and second finger unit driver 96, respectively, while the speed of the vertical downward movement is precisely controlled by the drive motor 100, and the upward movement, where precise speed control is not as critical, is free from control of the drive motor 100. This means that the drive control 104 can return the first and second finger units to their respective home positions quickly after they have delivered a stack.

Referring now to FIGS. 9A-9G, a method of operation of the stacking unit or assembly 24 is shown. For ease of illustration, FIGS. 9A-9G are simplified schematic views showing one illustrative embodiment of a stacking method or sequence illustrating the operation of the stacking unit or assembly 24.

At a beginning of a stacking cycle, when it is desired to stack a plurality of the printed materials 12 into the stack 34, the PLC 66 energizes the cylinders 58a, 58b, 62a and 62b such that both sets of fingers 56a, 56b and 60a, 60b are in their respective closed or receiving position (illustrated in FIG. 9A) where they can receive and support a stack of the plurality of the printed materials 12. While in this position, the PLC 66 also energizes the first finger unit driver 94 and second finger unit driver 96 to drive the first finger unit 50 and second finger unit 52, respectively, to the first and second finger unit home positions as illustrated in FIG. 9A if the first and second finger units 50 and 52 are not already in this position. Thus, it should be understood that in the position shown in FIG. 9A, both first finger unit 50 and the second finger unit 52 are in the upward position where both finger units are located toward a top portion or area 26a of the stacking area 26 (FIG. 1).

The plurality of printed materials 12 are fed into the stacking unit or assembly 24 by the crusher/pressing unit 20, which receive the printed materials 12 from the shingle feeder or printing press (not shown). In this regard, the belt 20a cooperates with the belt 20b to feed shingled the printed materials 12 onto the first pair of fingers 56a and 56b as shown in FIG. 9A. As the printed materials 12 accumulate and become stacked on the closed first pair of fingers 56a and 56b, the at least one stacking height sensor 140 senses the height or count of the stack 34 and generates the stacking height signal in response thereto. The PLC 66 receives that signal and energizes the first finger unit driver or cylinder 94, via the valve 121 (FIG. 8), to drive the first support or finger unit 50 substantially vertically downward. It should be understood that at this point the PLC 66 does not drive the second finger unit driver or cylinder 96. However, as mentioned earlier herein, it is important to note that the second finger unit driver or cylinder 96 is mounted on the support 68 of the first finger unit 50 so that as the first finger unit 50 is driven downward, the second finger unit 52 follows because it is affixed to the actuator arm 96a of the second finger unit driver or cylinder 96 which is mounted to the support 68 of the first finger unit 50.

During stacking, the PLC 66 also energizes the drive motor 100 to drive the shaft 102 and timing belts 118 and 120 so that the timing belt 118 controls the rate of descent of the first finger unit 50 and limits it to the first speed.

After a predetermined stacking height has occurred, the PLC 66 energizes valve 115 (FIG. 8) and cylinders 58a and 58b to retract the first and second pairs of fingers 56a and 56b such that the first and second pair of fingers 56a and 56b move to the first finger unit open or release position illustrated in FIG. 9B. Note that when the first and second pair of fingers 56a and 56b are in the open or release position, the stack 34 descends or falls onto the closed third and fourth pair of fingers 60a and 60b of the second finger unit 52 as shown. The PLC 66 energizes valve 121 (FIG. 8) and the first finger unit driver or cylinder 94 to drive the first finger unit 50 upward at the second speed which is uncontrolled and free because of the one-way pulley 106 as mentioned earlier. PLC 66 also energizes the cylinder 96, via valve 119 (FIG. 8), to drive the second finger unit 52 downward as the third and fourth pair of fingers 60a and 60b of the second finger unit 52 continue to receive the plurality of the printed materials 12 as illustrated in FIG. 9B. The PLC 66 continues to receive the stacking height signal from the at least one stacking height sensor 140. One function of the at least one stacking height sensor 140 is to allow the system 10 to provide a constant stack height during the stacking process. In the illustration being described, a generally known product counter 77 (FIG. 1), also referred as an edge counter, counts the printed materials 12 during the incline of the infeed. The counter 77 counts the printed materials 12, and when the PLC 66 determines that the desired stack count is reached, the conventional gapper unit 30 (FIG. 1) is fired to begin a new bundle or stack 34. The PLC 66 energizes valve 115 (FIG. 8) to close the first pair of fingers 56a, 56b. While a new stack gets built on the first finger unit 50 (FIG. 9C), the servo motor 100 increases its speed to drive the second finger unit 52 with the finished stack to its release position. When the second finger unit 52 reaches this release position, the servo motor 100 returns back to its normal descent speed. At this time or later, the stack height sensor signals that the new stack on the first finger unit 50 has reached its height for descent. The PLC 66 energizes the cylinder 94, via valve 121 (FIG. 8), to drive the first finger unit 50 downward as the first and second fingers 56a and 56b of the first finger unit 50 continue to receive the plurality of the printed materials 12 as illustrated in FIG. 9D. The PLC 66 energizes or continues to energize drive motor 100 to drive the timing belts 118 and 120 so that the rate of descent of the first finger unit 50 is precisely and accurately controlled by the drive motor 100 and limited to the first speed at which the drive motor 100 drives the timing belts or chains 118 and 120.

At this point and while the first finger unit 50 continues to begin receiving another stack 34 of printed materials 12, the second finger unit drive, comprising the cylinders 62a or 62b, drives the second pair of fingers 60a and 60b to the open or release position illustrated in FIG. 9E. Of course, when the third and fourth pair of fingers 60a and 60b are in the open or release position the stack 34 may descend or fall from the second finger unit 52 onto the table 40a of the rotary turn table 40.

After several stacks 34 are received on the table 40a, the conventional pushing unit 42, which is under the control of PLC 66, may then push the stack 34 out of the lower stacking area 44. During stacking on the rotary table 40a, the table 40a may be rotated a predetermined number of degrees, such as 180, in a manner conventionally known.

After the second finger unit 52 releases its stack, the PLC 66 energizes the second finger unit driver 96, via valve 119 (FIG. 8), until the second finger unit 52 returns to the position underneath the first finger unit 50 as illustrated in FIG. 9F. The PLC 66 also energizes the cylinders 62a and 62b, via valve 113, and drives the second set or pair of fingers 60a and 60b, respectively, to the stacking or closed position.

As illustrated in FIG. 9G, at this point the second finger unit 52 is again prepared to receive the descending stack 34 from the first finger unit 50, and the PLC 66 energizes the cylinders 58a and 58b to retract the first pair of fingers 56a and 56b so that the next stack 34 can descend or fall from the first finger unit 50 to the pair of second fingers 60a and 60b which are in the closed position as illustrated in FIG. 9G. Further printed materials 12 are received on the second finger unit 52 until the second predetermined stacking height is reached, whereupon the next stack 34 of printed materials 12, shown in FIG. 9G, are then delivered to the rotary turn table 40a in the manner described earlier herein. The process repeats as shown in FIGS. 9E-9G until it determined that no further stacking is desired, in which case the printed materials 12 are caused to cease from entering the stacking area 26 and the first and second finger units 50 and 52 are driven to their starting position, illustrated in FIG. 9A, in preparation for another stacking operation. Again, the pushing unit 42 may push the multiple stacks 34 off the table 40a if desired.

Advantageously, the embodiments shown herein permits the second finger unit 52 to always be situated below the first finger unit 50 during stacking, and neither finger unit has to travel through the other finger unit in the manner of some prior art alternating stacker devices, such as the device shown in U.S. Pat. No. 6,149,149. Again, it should be appreciated that the first and second finger units 50 and 52 are driven from the first finger unit home position and the second finger unit home position, respectively, to the first finger unit release position and second finger unit release position at the first speed that is controlled by the drive motor 100, while the first and second one-way pulleys 106 and 108 permit the first and second finger units 50 and 52 to be freely driven at the second speed when returning from their respective release positions back to their first finger unit home position and second finger unit home position. Advantageously, the second speed can be much greater than the first speed and does not have to be precisely controlled as does the first speed which is directly related and based upon the speed at which the shingled printed materials 12 are fed into the stacking unit or assembly 24. In this regard, the feeding speed at which the printed materials 12 are fed into the stacking unit or assembly 24 can vary from between 30,000 to 120,000 copies per hour.

Note that the stacking unit or assembly 24 also permits the use of relatively inexpensive pneumatic drivers 94 and 96 that, when used with the drive motor 100, permit a precisely controlled rate of descent of the first and second finger units 50 and 52, respectively, at the first speed, but free operation and movement of the first finger unit 50 and second finger unit 52 in the upward direction. It has been found that the second speed of upward ascent can be established much higher using cylinders 94 and 96, which speed can be much less accurate because it is not dependent upon how fast the printed materials 12 are being fed into the stacking unit or assembly 24, because the speed is used only to return the first and second finger units 50 and 52 to their respective home positions. This facilitates quick recovery of the first and second finger units 50 and 52 after they have delivered the stack 34 as described herein.

It should be understood that while the illustration being described has the first finger unit 50 and the second finger unit 52 always in the vertical and stacked relationship, as illustrated in FIGS. 9A-9G, wherein the second finger unit 52 is always below (as viewed in the figures) the first finger unit, it should be understood that the features of the drive control 104 and the construction and assembly of the various components of the systems shown in FIG. 8, for example, may be used with a traditional alternating stacker of the type mentioned earlier herein. Also, although not shown, the features of the invention may be used with other types of supports, such as supports that utilize only one finger grid or set (e.g., fingers 56a without 56b) that employs relatively longer fingers (not shown) or supports that do not employ fingers.

In another embodiment of the invention, the invention comprises a method for more stacking products in a stacker having a first support and a second support that are independently driven by a first drive and a second drive, respectively; the method comprising the steps of: situating the first support in a first support home position and the second support in a second support home position; forwarding a number of products onto the first support to provide a first stack of products on the first support; driving the first support at a first speed in a first direction as it receives the first stack of products; opening the first support so that the first stack of products are received on the second support; driving the first support at a second speed in a second direction that is opposite the first direction until it reaches the first support home position, the second speed being greater than the first speed; forwarding a second number of products onto the first stack to provide a second stack of products on the second support; driving the second support at the first speed in the first direction as it receives the second stack of products; opening the second support so that the second stack of products are received at a downstream station; driving the second support in the second direction until it reaches the second support home position; and providing a drive control for controlled driven movement of the first and second supports at the first speed while substantially simultaneously permitting free driven movement of the first and second supports at the second speed in the second direction. The method could be used with one or more of the following components, features or steps:

rotatably driving a shaft with a drive motor having a first one-way pulley and a second one-way pulley mounted thereon, said first and second one-way pulleys permitting said controlled driven movement of said first and second supports in said first direction, while substantially simultaneously permitting said free driven movement of said first and second supports in said second direction;

the first speed is less than said second speed;

the driving steps are affected by a first cylinder coupled to said first support and a second cylinder coupled to said second support and said first speed is controlled by a drive motor;

the first and second cylinders are pneumatic cylinders and said drive motor is a servo motor;

the first direction is downward and said second direction is upward, said method further comprising the components, features or steps of:

providing a first timing belt or chain coupled to said first support and engaging said first one-way pulley;

providing a second timing belt or chain coupled to said second support and engaging said second one-way pulley;

said first and second one-way pulleys permitting said drive motor to control said first speed at which a first support driver drives said first support downward or a second support driver drives said second support downward, while permitting said first support driver to freely drive said first support freely upward at a first support return speed controlled by said first support driver and permitting said second support driver to drive said second support freely upward at a second support return speed controlled by said second support driver, each of said first support return speed and said second support return speed being without control of said drive motor;

the first and second one-way pulleys each comprise a one-way bearing or a one-way clutch.

In another embodiment of the invention, the invention comprises a method for driving a printed material support in a stacker comprising the steps of driving the stacker in a downward direction utilizing an actuator or cylinder at a first speed that is controlled by a drive motor; and using the actuator or cylinder the drive the printed material support in an upward direction that is uncontrolled and at a second speed that is greater than the first speed. This method could be used with one or more of the steps mentioned above or one or more of the following components, features or steps:

utilizing a plurality of actuators to drive a plurality of printed material supports at the first speed and the second speed;

utilizing a pneumatic cylinder to drive the printed material support in the first direction; and coupling the printed material support to a servo drive motor that precisely controls the movement of the printed material support as it is driven by the actuator or cylinder in the downward direction.

While the system and method herein described, and the form of apparatus for carrying this method into effect, constitute preferred embodiments of this invention, it is to be understood that the invention is not limited to this precise system and method and form of apparatus, and that changes may be made in either without departing from the scope of the inventions, which is defined in the appended claims.

What is claimed is:

1. A stacker for stacking printed materials, said stacker comprising:

a first support having a first finger unit having a first pair of fingers and a first finger drive for driving said first pair of fingers between a first finger unit open position and a first finger unit closed position;

a second support having a second finger unit having a second pair of fingers and a second finger drive said second pair of fingers between a second finger unit open position and a second finger unit closed position;

at least one motor;

a drive control for coupling said at least one motor to said first support and said second support, said drive control permitting said at least one motor drive at least one of said first support or said second support at a first speed that is controlled by said at least one motor;

a first finger unit drive coupled to said first finger unit for driving said first finger unit between a first finger unit home position and a first finger unit release position;

a second finger unit driver coupled to said second finger unit for driving said second finger unit between a second finger unit home position and a second finger unit release position;

said drive control controlling said first finger unit driver, said second finger unit driver, said first finger drive of said first finger unit, said second finger drive of said second finger unit, and said at least one motor;

said drive control being adapted to energize said at least one motor to drive said first and second supports in a first direction at said first speed that is controlled by said at least one motor and permitting movement in a second direction opposite said first direction at a second speed that is not controlled by said at least one motor.

2. A stacker for stacking printed materials, said stacker comprising;
a first support;
a second support;
at least one motor;
at least one driver coupled to said first support and said second support for driving said first support and said second support substantially vertically; and
a drive control for coupling said at least one motor to said first support and said second support, said drive control permitting said at least one driver to drive at least one of said first support or said second support at a first speed that is controlled by said at least one motor,
wherein said drive control further comprises:
at least one one-way bearing or one-way clutch that couples said at least one motor to said first support and said second support, said at least one one-way bearing or one-way clutch permitting said at least one driver to drive at least one of said first support or said second support at said first speed from a home position to a release position, with said first speed being under the control of said at least one motor, said at least one one-way bearing or one-way clutch also permitting said at least one driver to drive said first support and said second support at a second speed from said release position to said home position during which said at least one motor does not control said second speed.

3. The stacker as recited in claim 2 wherein said second speed is greater than said first speed.

4. A stacker for stacking printed materials, said stacker comprising:
a first support:
a second support;
at least one motor;
at least one driver coupled to said first support and said second support for driving said first support and said second support substantially vertically; and
a drive control for coupling said at least one motor to said first support and said second support, said drive control permitting said at least one driver to drive at least one of said first support or said second support at a first speed that is controlled by said at least one motor,
wherein said drive control further comprises:
a drive shaft that is driven by said at least one motor;
a first one-way pulley or gear mounted on said drive shaft;
a second one-way pulley or gear mounted on said drive shaft;
a first timing belt, chain or rack coupled to said first support and engaging said first one-way pulley or gear;
a second timing belt, chain or rack coupled to said second support and engaging said second one-way pulley or gear;
said first one-way pulley or gear and second one-way pulley or gear permitting said at least one motor to control said first speed at which said at least one driver drives said first support or said second support downward and permitting said at least one driver to drive said first support or said second support freely upward without control of said at least one motor.

5. The stacker as recited in claim 4 wherein each of said first one-way pulley or gear and second one-way pulley or gear comprise a one-way bearing or one-way clutch.

6. The stacker as recited in claim 4 wherein said at least one driver comprises a first support driver for driving said first support and a second support driver for driving said second support, said first support driver and said second support driver driving said first support and said second support, respectively, downward at said first speed that is controlled by said at least one motor, and driving said first support and said second support freely upward without any speed control from said at least one motor.

7. The stacker as recited in claim 6 wherein said first and second support drivers are coupled to said first support.

8. The stacker as recited in claim 2 wherein said at least one driver comprises a pneumatic cylinder or a hydraulic cylinder.

9. The stacker as recited in claim 1 wherein said stacker further comprises:
   at least one stacking height sensor for sensing a stacking height of printed materials that are stacked on at least one of said first support or said second support and generating a stacking height signal in response thereto;
   said at least one motor being energized to cause said first speed to be adjusted in response to said stacking height signal.

10. The stacker as recited in claim 6 wherein said first support comprises first support fingers adapted to move between a closed position during which the printed materials can be stacked thereon and an open position during which any printed materials stacked thereon may descend onto said second support, said second support also comprising a pair of second support fingers adapted to move between a closed position during which said printed materials can be stacked thereon and an open position during which any printed materials stacked thereon may descend or be released to a downstream station; said stacker further comprising:
   a programmable logic controller for controlling said first support driver, said second support driver and said at least one motor;
   at least one stacking height sensor for sensing a stacking height of printed materials that are stacked on at least one of said first support or said second support and generating a stacking height signal in response thereto;
   said programmable logic controller receiving said stacking height signal and energizing said at least one motor to drive said first one-way pulley or gear and second one-way pulley or gear in a first direction at said first speed so that when said first support driver and said second support driver drives said first support and said second support, respectively, said first support and said second support are driven at said first speed;
   said programmable logic controller causing after the release of the printed materials by the first and second supports to reverse the direction of the first support driver and second support driver, allowing them to freely move the first and second supports back to their respective home position.

11. The stacker as recited in claim 10, wherein said programmable logic controller adjusts said first speed in response to said stacking height signal so that said first support driver may drive said first support at said first speed when said first support fingers are closed and said second support driver may drive said second support at said first speed when said second support fingers are closed.

12. The stacker as recited in claim 1 wherein said second support is underneath said first support at all times during a stacking cycle when said second support is receiving printed materials.

13. The stacker as recited in claim 1 wherein said stacker is an alternating stacker and said first and second supports alternate being above each other during alternating stacking cycles.

14. A stacker for stacking printed materials for transfer to a downstream station, said stacker comprising:
   a first support;
   a second support;
   at least one motor coupled to a shaft;
   a drive control mounted on said shaft and coupling said shaft to said first support and said second support;
   a first support driver for driving said first support between a first support home position and a first support release position;
   a second support driver for driving said second support between a second support home position and a second support release position;
   said drive control enabling said first and second support drivers to drive said first support and said second support, respectively, downward at a first speed that is controlled by said at least one motor and to drive said first support and said second support freely upward without any speed control of said at least one motor.

15. The stacker as recited in claim 14 wherein said drive control enables said first and second support drivers to drive said first and second supports, respectively, independently and in opposite directions while said shaft moves in only one direction.

16. The stacker as recited in claim 14 wherein said drive control enables said first and second support drivers to drive said first and second supports, respectively, in a first direction and a second direction opposite said first direction while said at least one motor drives said shaft in only one of said first or second directions.

17. The stacker as recited in claim 14 wherein said drive control comprises:
   a first one-way pulley or gear mounted on said shaft;
   a second one-way pulley or gear mounted on said shaft;
   a first timing belt, chain or rack coupled to said first support and engaging said first one-way pulley or gear;
   a second timing belt, chain or rack coupled to said second support and engaging said second one-way pulley or gear;
   said first and second one-way pulleys or gears permitting said at least one motor to control said first speed at which said first support driver drives said first support downward and said second support driver drives said second support downward, while permitting said first support driver to drive said first support upward at a first support return speed controlled by said first support driver and permitting said second support driver to drive said second support freely upward at a second support return speed controlled by said second support driver, each of said first support return speed and said second support return speed being without control of said at least one motor.

18. The stacker as recited in claim 17 wherein said first support return speed and said second support return speed are both greater than said first speed.

19. The stacker as recited in claim 17 wherein said first one-way pulley or gear and second one-way pulley or gear each comprise at least one of a one-way bearing or a one-way clutch.

20. The stacker as recited in claim 14 wherein said first support driver and said second support driver comprises at least one of a pneumatic cylinder or a hydraulic cylinder.

21. The stacker as recited in claim 14 wherein said stacker further comprises:
   at least one stacking height sensor for sensing a stacking height or count of printed materials that are stacked on said first support or said second support and generating a stacking height signal in response thereto;
   said at least one motor being energized to cause said first speed to be adjusted in response to said stacking height signal.

22. The stacker as recited in claim 14 wherein said first support comprises a first support finger unit comprising a pair of first support fingers adapted to move between a closed position during which the printed materials can be stacked thereon and an open position during which any printed materials stacked thereon may descend onto said second support, said second support comprising a second support finger unit comprising a pair of second support fingers adapted to move between a closed position during which said printed materials can be stacked thereon and an open position during which any printed materials stacked thereon may descend to said downstream station.

23. The stacker as recited in claim 22 wherein said stacker further comprises:
   a programmable logic controller for controlling said first support driver, said second support driver, said first support finger unit, said second support finger unit, and said at least one motor;
   at least one stacking height sensor for sensing a stacking height or count of printed materials that are stacked on at least one of said first support or said second support and generating a stacking height signal in response thereto;
   said programmable logic controller receiving said stacking height signal and energizing said at least one motor to drive said shaft in a first direction at said first speed so that when said first support driver and said second support driver drives said first support and said second support, respectively, said first support and said second support are driven at no greater than said first speed.

24. The stacker as recited in claim 23 wherein said programmable logic controller causes said pair of first support fingers to move to said closed position and said pair of second support fingers to move to said open position to cause printed materials on said second support to move to the downstream station when said stack of said printed materials on said second support reaches a predetermined product count and further energizing said second support driver to drive said second support to said second support home position, a one-way pulley or gear enabling said second support driver to drive said second support freely and at a second support return speed from said release position to said second support home position without control of said at least one motor.

25. The stacker as recited in claim 23, wherein said programmable logic controller adjusts said first speed in response to said stacking height signal.

26. The stacker as recited in claim 14 wherein second support home position of said second support is underneath said first support at all times during a stacking cycle.

27. The stacker as recited in claim 14 wherein a first support vertical position of said first support alternates being relatively higher than a second support vertical position of said second support over a predetermined number of stacking cycles.

28. The stacker as recited in claim 27 wherein said first support and said second support passes through said second support and said first support, respectively, as they move to their respective home positions at which they begin receiving printed materials.

29. The stacker as recited in claim 14 wherein the downstream station comprises a rotary table.

30. The stacker as recited in claim 14 wherein said first and second support drivers are coupled to said first support.

31. The stacker as recited in claim 14 wherein each of the second support drivers is mounted to the first support and has an armature coupled to the second support.

32. A stacking system for stacking printed materials received from a feeder and feeding the stacked printed materials to a downstream station, said stacking system comprising;
   a first finger unit having a first pair of fingers and a first finger drive for driving said first pair of fingers between a first finger unit open position and a first finger unit closed position;
   a second finger unit having a second pair of fingers and a second finger drive for driving said second pair of fingers between a second finger unit open position and a second finger unit closed position;
   a first finger unit driver coupled to said first finger unit for driving said first finger unit between a first finger unit home position and a first finger unit release position;
   a second finger unit driver coupled to said second finger unit for driving said second finger unit between a second finger unit home position and a second finger unit release position;
   a drive motor coupled to a shaft for driving said shaft at a first speed;
   a first one-way pulley or gear mounted on said shaft;
   a second one-way pulley or gear mounted on said shaft;
   a first timing belt, chain or rack engaging said first one-way pulley or gear and coupled to said first finger unit; and
   a second timing belt, chain or rack engaging said second one-way pulley or gear and coupled to said second finger unit; and
   a programmable logic controller for controlling said first finger unit driver, said second finger unit driver, said first finger drive of said first finger unit, said second finger drive of said second finger unit, and said drive motor;
   said programmable logic controller energizing said drive motor to drive said shaft at said first speed, said first and second one-way pulleys permitting said first finger unit driver and said second finger unit driver to drive said first finger unit and said second finger unit, respectively, in a first direction at a first speed controlled by said drive motor and permitting movement in a second direction opposite said first direction at a second speed that is not controlled by said drive motor.

33. The stacking system as recited in claim 32 wherein said programmable logic controller energizes said first finger drive to drive said first pair of fingers to move to said closed position and said second finger drive to drive said second pair of fingers to move to said open position so that printed materials that are stacked on said second finger unit descend to the downstream station when said programmable logic controller determines in response to a product count signal, that said printed materials on said second finger unit have reached a predetermined product count;
   said programmable logic controller further energizing said second finger unit driver to drive said second finger unit to said second finger unit home position, said second one-way pulley enabling said second finger unit driver to drive said second finger unit freely and at a second finger unit return speed from said second finger unit release position to said second finger unit home position and without control of said drive motor, thereby causing said second one-way pulley to move in a second direction opposite said first direction.

34. The stacking system as recited in claim 33 wherein said programmable logic controller energizes said drive motor to drive said shaft and said second finger unit driver to drive said second finger downward in a first direction under control of said drive motor and said second one-way pulley or gear while substantially simultaneously energizing said first finger unit driver to drive said first finger unit upward in a second direction that is opposite said first direction with said first one-way pulley or gear enabling free movement without control of said drive motor.

35. The stacking system as recited in claim 32 wherein said first and second one-way pulleys or gears enable said first and second finger unit drivers to drive said first finger unit and said second finger unit, respectively, downward at said first speed that is controlled by said drive motor and driving said first finger unit and said second finger unit freely upward without any speed control of said drive motor, said first and second one-way pulleys enabling said first and second finger unit drivers to be substantially simultaneously driven in common or opposite directions.

36. The stacking system as recited in claim 32 wherein said programmable logic controller energizes said first and second finger unit drivers to drive said first and second finger units, respectively, independently.

37. The stacking system as recited in claim 32 wherein said programmable logic controller energizes said first and second finger unit drivers to drive said first and second finger units, respectively, in different directions while said drive motor drives said shaft and said first and second one-way pulleys in a common direction.

38. The stacking system as recited in claim 32 wherein said first and second one-way pulleys permit said drive motor to control said first speed at which said first finger unit driver drives said first finger unit downward or said second finger unit driver drives said second finger unit downward, while permitting said first finger unit driver to freely drive said first finger unit upward at a first finger unit return speed controlled by said first finger unit driver and permitting said second finger unit driver to drive said second finger unit freely upward at a second finger unit return speed controlled by said second finger unit driver, each of said first finger unit return speed and said second finger unit return speed being without control of said drive motor.

39. The stacking system as recited in claim 38 wherein said first finger unit return speed and said second finger unit return speed are both greater than said first speed.

40. The stacking system as recited in claim 32 wherein said first one-way pulley or gears and second one-way pulley or gears each comprise at least one of a one-way bearing or one-way clutch.

41. The stacking system as recited in claim 32 wherein said first finger unit driver and said second finger unit driver comprises at least one of a pneumatic cylinder or a hydraulic cylinder.

42. The stacking system as recited in claim 32 wherein said programmable logic controller adjusts said first speed in response to a height of stacked printed materials.

43. The stacking system as recited in claim 32 wherein said second finger unit home position of said second finger unit is underneath said first finger unit at all times during a stacking cycle when said second finger unit is receiving printed materials.

44. The stacking system as recited in claim 32 wherein a vertical position of said first finger unit alternates being relatively higher than a vertical position of said second finger unit over alternating stacking cycles.

45. The stacking system as recited in claim 44 wherein said second finger unit passes between said first pair of fingers when said second finger unit moves from said second finger unit release position to said second finger unit home position and said first finger unit passes between said second pair of fingers when said first finger unit moves from said first finger unit release position to said first finger unit home position.

46. The stacking system as recited in claim 32 wherein the downstream station comprises a rotary table.

47. The stacking system as recited in claim 32 wherein the printed materials are printed and folded product and the feeder is a shingle feeder or printing press for feeding said printed and folded product to said first and second finger units.

48. The stacking system as recited in claim 32 wherein said system comprises at least one sensor for generating a signal used to energize said drive motor.

49. The stacking system as recited in claim 48 wherein said at least one sensor comprises at least one stacking height sensor for sensing a stacking height of printed materials that are stacked on at least one of a first finger unit or a second finger unit and generating a stacking height signal in response thereto.

50. The stacking system as recited in claim 32 wherein said system comprises at least one counter for counting said printed materials.

* * * * *